United States Patent
Yoon et al.

(10) Patent No.: US 12,022,511 B2
(45) Date of Patent: Jun. 25, 2024

(54) METHOD FOR TRANSMITTING AND RECEIVING UPLINK IN UNLICENSED BAND, AND DEVICE THEREFOR

(71) Applicant: LG ELECTRONICS INC., Seoul (KR)

(72) Inventors: Sukhyon Yoon, Seoul (KR); Joonkui Ahn, Seoul (KR); Changhwan Park, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/310,060

(22) PCT Filed: Dec. 20, 2019

(86) PCT No.: PCT/KR2019/018151
§ 371 (c)(1),
(2) Date: Jul. 14, 2021

(87) PCT Pub. No.: WO2020/153610
PCT Pub. Date: Jul. 30, 2020

(65) Prior Publication Data
US 2022/0095376 A1  Mar. 24, 2022

(30) Foreign Application Priority Data

Jan. 24, 2019  (KR) .......................... 10-2019-0009250

(51) Int. Cl.
*H04W 74/0816*  (2024.01)
*H04W 72/0453*  (2023.01)
(Continued)

(52) U.S. Cl.
CPC ... *H04W 74/0816* (2013.01); *H04W 72/0453* (2013.01); *H04W 74/0866* (2013.01); *H04W 76/20* (2018.02); *H04W 76/30* (2018.02)

(58) Field of Classification Search
CPC . H04W 16/14; H04W 24/10; H04W 72/0453; H04W 74/0808; H04W 74/0816;
(Continued)

(56) References Cited

U.S. PATENT DOCUMENTS

2019/0059029 A1* 2/2019 Lunden ................. H04W 36/30
2021/0212112 A1* 7/2021 Jia ......................... H04W 76/27
(Continued)

FOREIGN PATENT DOCUMENTS

WO    2017118142     7/2017

OTHER PUBLICATIONS

PCT International Application No. PCT/KR2019/018151, International Search Report dated Apr. 14, 2020, 15 pages.
(Continued)

*Primary Examiner* — Gary Mui
(74) *Attorney, Agent, or Firm* — LEE, HONG, DEGERMAN, KANG & WAIMEY

(57) ABSTRACT

Disclosed is a method for a terminal to redirect a serving cell in an unlicensed band. In particular, the method may involve: receiving information related to the transmission probability of a Radio Resource Measurement-Reference Signal (RRM-RS) from each of a plurality of cells by means of Listen Before Talk (LBT); ascertaining, on the basis of the information, whether to redirect the serving cell; and redirecting the serving cell on the basis of the ascertainment on whether to perform redirection.

9 Claims, 25 Drawing Sheets

(51) Int. Cl.
*H04W 74/08* (2009.01)
*H04W 76/20* (2018.01)
*H04W 76/30* (2018.01)

(58) Field of Classification Search
CPC . H04W 74/0866; H04W 76/10; H04W 76/20; H04W 76/30
See application file for complete search history.

(56) References Cited

U.S. PATENT DOCUMENTS

| | | | |
|---|---|---|---|
| 2021/0282188 A1* | 9/2021 | Cui | H04L 1/1822 |
| 2021/0392534 A1* | 12/2021 | Kim | H04W 48/18 |
| 2022/0070930 A1* | 3/2022 | Xiong | H04W 74/0891 |
| 2022/0094497 A1* | 3/2022 | Shibaike | H04L 1/0027 |
| 2022/0095177 A1* | 3/2022 | Han | H04W 48/20 |
| 2022/0124812 A1* | 4/2022 | Hong | H04W 74/0833 |

OTHER PUBLICATIONS

ZTE, "consideration on SR enhancement for NR-U operation," R1-1816833, 3GPP TSG RAN WG2 NR #104 Meeting, Nov. 2018, 4 pages.
Interdigital Inc., "Mobility for NR-U," R2-1811455, 3GPP RAN WG2 Meeting #103, Aug. 2018, 7 pages.
Interdigital Inc., "HARQ Enhancements for NR-U," R1-1900788, 3GPP TSG RAN WG1 Ad-Hoc Meeting 1901, Jan. 2019, 9 pages.
OPPO, "SR transmission and procedure for NR-U and the corresponding TP," R2-1816260, 3GPP TSG-RAN WG2 Meeting #104, Nov. 2018, 6 pages.

* cited by examiner (A) CONTROL-PLANE PROTOCOL STACK (B) USER-PLANE PROTOCOL STACK

METHOD FOR TRANSMITTING AND RECEIVING UPLINK IN UNLICENSED BAND, AND DEVICE THEREFOR

CROSS-REFERENCE TO RELATED APPLICATIONS

This application is the National Stage filing under 35 U.S.C. 371 of International Application No. PCT/KR2019/018151, filed on Dec. 20, 2019, which claims the benefit of earlier filing date and right of priority to Korean Application No. 10-2019-0009250, filed on Jan. 24, 2019, the contents of which is hereby incorporated by reference herein in its entirety.

TECHNICAL FIELD

The present disclosure relates to a method for transmitting and receiving uplink signals in an unlicensed band and a device for the same, and more particularly to a method and device for transmitting and receiving uplink signals when Listen Before Talk for uplink transmission continuously fails in an unlicensed band.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method and device for transmitting and receiving uplink signals in an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for enabling a user equipment (UE) to transmit an uplink (UL) signal in an unlicensed band may include performing a listen before talk (LBT) operation required to transmit the uplink (UL) signal in a first frequency range, releasing radio resource control (RRC) connection to a serving cell covering the first frequency range, based on information indicating that the listen before talk (LBT) operation has failed a predetermined number of times or more, performing RRC connection related to a second frequency range different from the first frequency range, and transmitting the uplink (UL) signal in the second frequency range.

The releasing the RRC connection to the serving cell may include measuring channel load of the first frequency range based on the information indicating that the listen before talk (LBT) operation has failed a predetermined number of times or more, and releasing RRC connection to the serving cell based on information indicating that the channel load is higher than a threshold.

The performing the RRC connection related to the second frequency range may include measuring channel load of the first frequency range, and performing RRC connection related to the second frequency range based on information indicating that the channel load is higher than a threshold.

The method may further include, in a channel occupancy time (COT) section, transmitting, to a base station (BS), report information related to the information indicating that listen before talk (LBT) failure has occurred the predetermined number of times or more.

The performing the RRC connection related to the second frequency range different from the first frequency range may include performing RRC connection to a cell related to the second frequency range different from the first frequency range, based on information indicating that a response signal related to the report information was not received for a predetermined time.

The user equipment (UE) may communicate with at least one of another user equipment (UE) other than the UE, a network, a base station (BS), and an autonomous vehicle.

In accordance with another aspect of the present disclosure, a user equipment (UE) configured to transmit an uplink (UL) signal in an unlicensed band may include at least one transceiver, at least one processor, and at least one memory operatively connected to the at least one processor, and configured to store instructions such that the at least one processor performs specific operations by executing the instructions. The specific operations may include performing a listen before talk (LBT) operation required to transmit the uplink (UL) signal in a first frequency range, releasing radio resource control (RRC) connection to a serving cell covering the first frequency range, based on information indicating that the listen before talk (LBT) operation has failed a predetermined number of times or more, performing RRC connection related to a second frequency range different from the first frequency range, and transmitting the uplink (UL) signal in the second frequency range by the at least one transceiver.

The releasing the RRC connection to the serving cell may include measuring channel load of the first frequency range based on the information indicating that the listen before talk (LBT) operation has failed a predetermined number of times or more, and releasing RRC connection to the serving cell based on information indicating that the channel load is higher than a threshold.

The performing the RRC connection related to the second frequency range may include measuring channel load of the first frequency range, and performing RRC connection related to the second frequency range based on information indicating that the channel load is higher than a threshold.

The specific operation may include, in a channel occupancy time (COT) section, transmitting, to a base station (BS), report information related to the information indicating that listen before talk (LBT) failure has occurred the predetermined number of times or more.

The performing the RRC connection related to the second frequency range different from the first frequency range may include performing RRC connection to a cell related to the second frequency range different from the first frequency range, based on information indicating that a response signal related to the report information was not received for a predetermined time.

The user equipment (UE) may communicate with at least one of another user equipment (UE) other than the UE, a network, a base station (BS), and an autonomous vehicle.

In accordance with another aspect of the present disclosure, a device configured to transmit an uplink (UL) signal in an unlicensed band may include at least one processor, and at least one memory operatively connected to the at least one processor, and configured to store instructions such that the at least one processor performs specific operations by executing the instructions. The specific operations may include performing a listen before talk (LBT) operation required to transmit the uplink (UL) signal in a first frequency range; releasing radio resource control (RRC) connection to a serving cell covering the first frequency range, based on information indicating that the listen before talk (LBT) operation has failed a predetermined number of times or more; performing RRC connection related to a second frequency range different from the first frequency range; and transmitting the uplink (UL) signal in the second frequency range by the at least one transceiver.

Advantageous Effects

As is apparent from the above description, the embodiments of the present disclosure can effectively transmit and receive uplink (UL) signals although Listen before Talk (LBT) for uplink (UL) transmission fails continuously.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
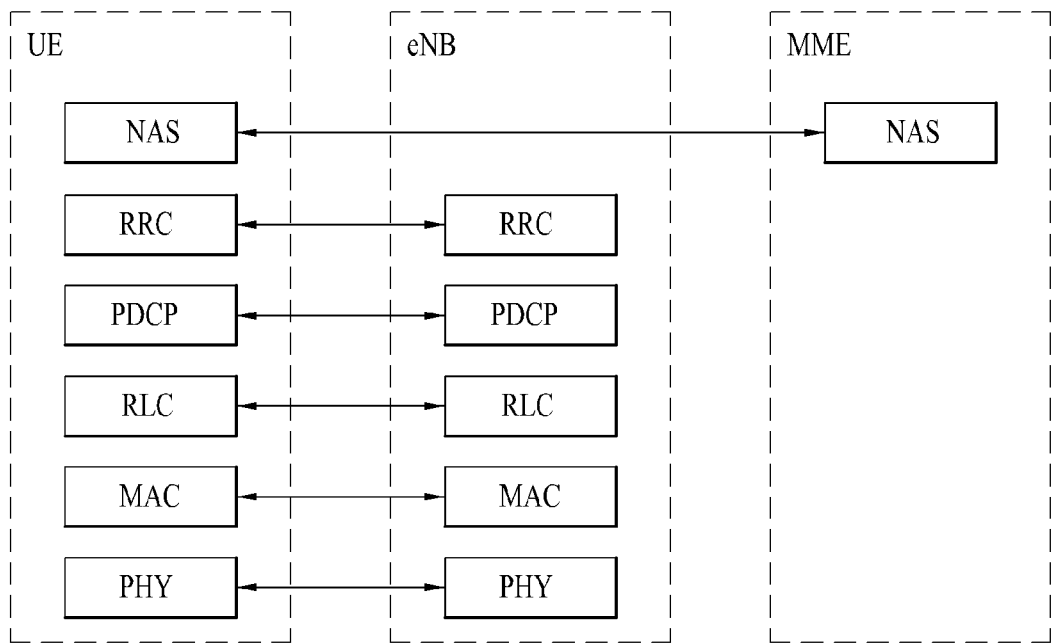
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
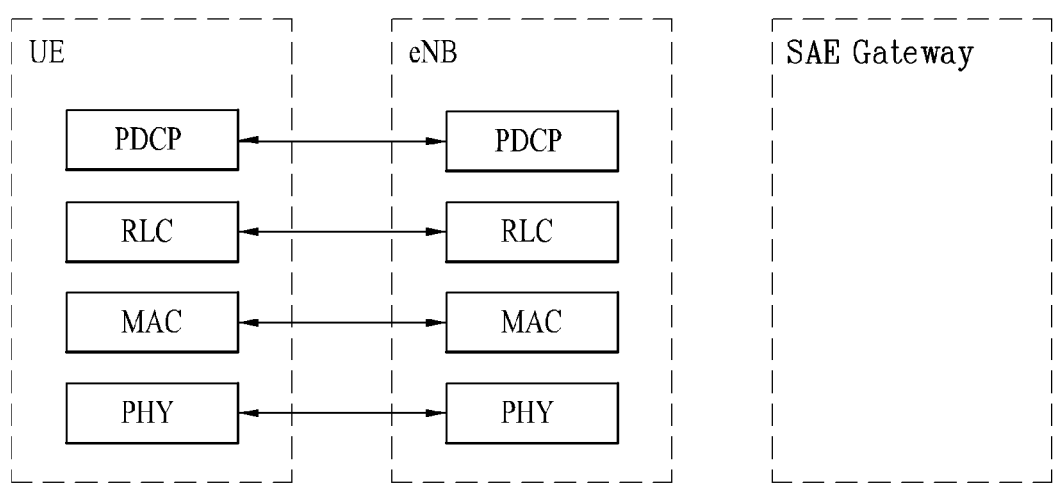

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH)

are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
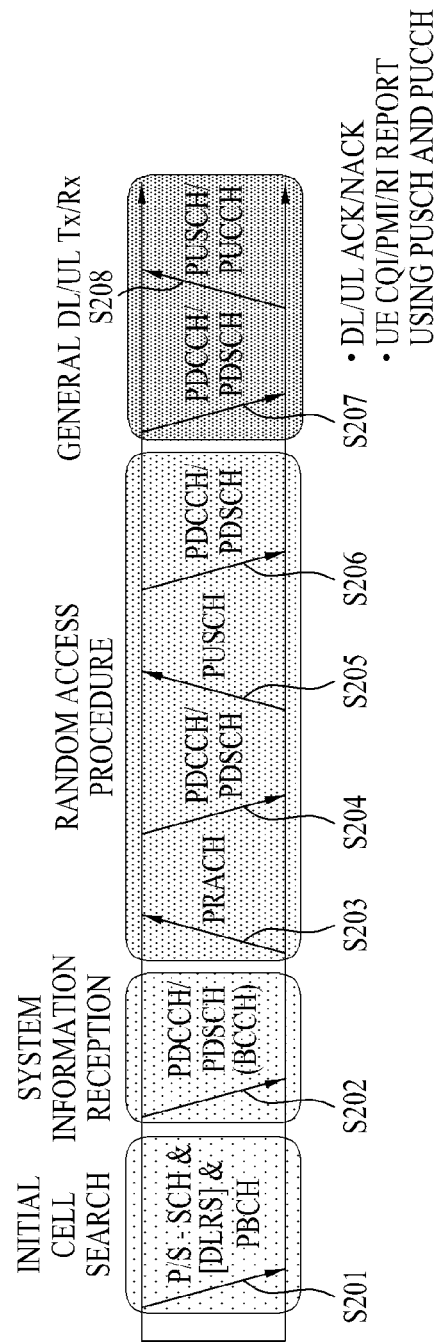
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DL RS.

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
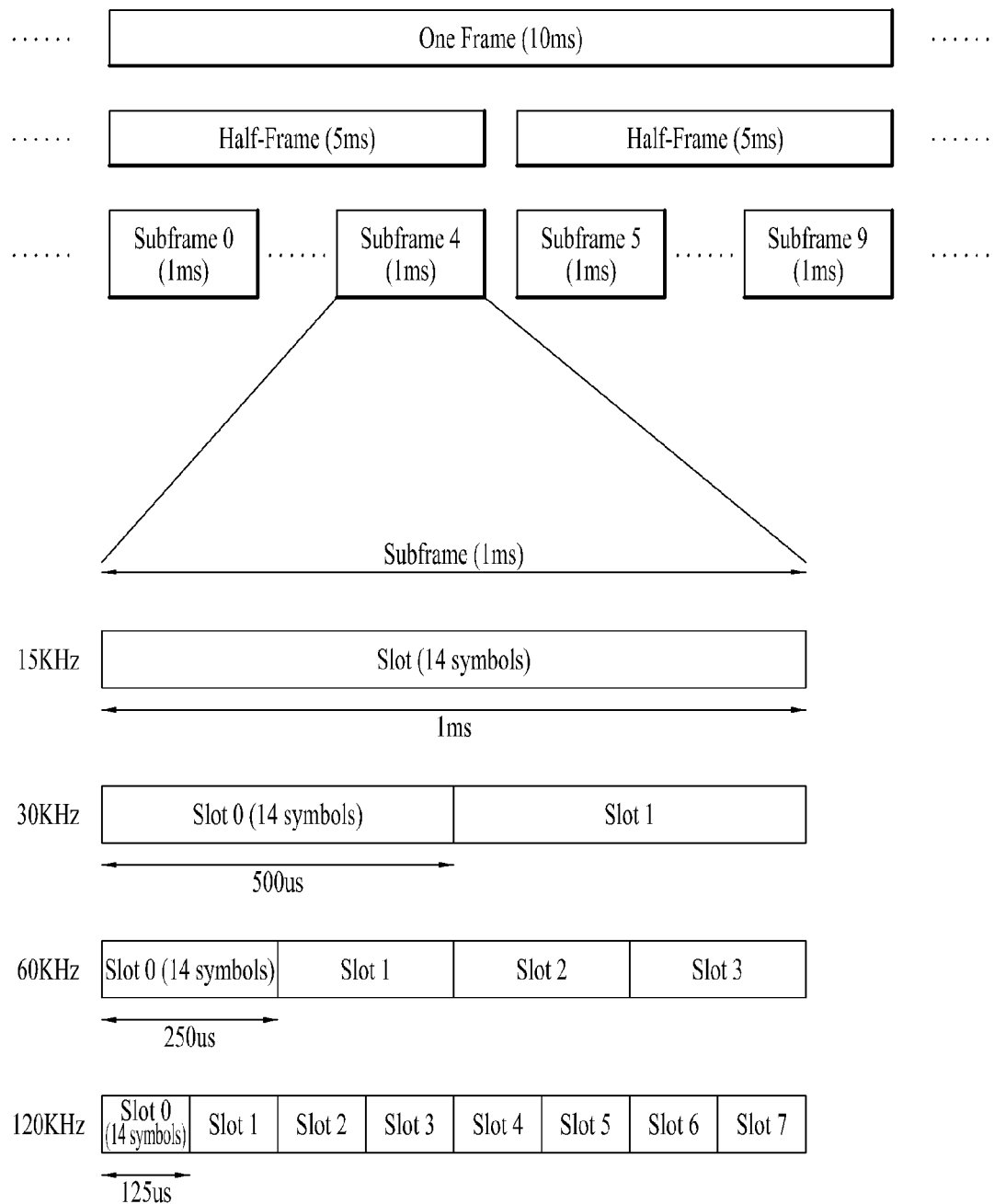
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* Nslotsymb: Number of symbols in a slot,
* Nframe,uslot: Number of slots in a frame
* Nsubframe,uslot: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

Figure 4:
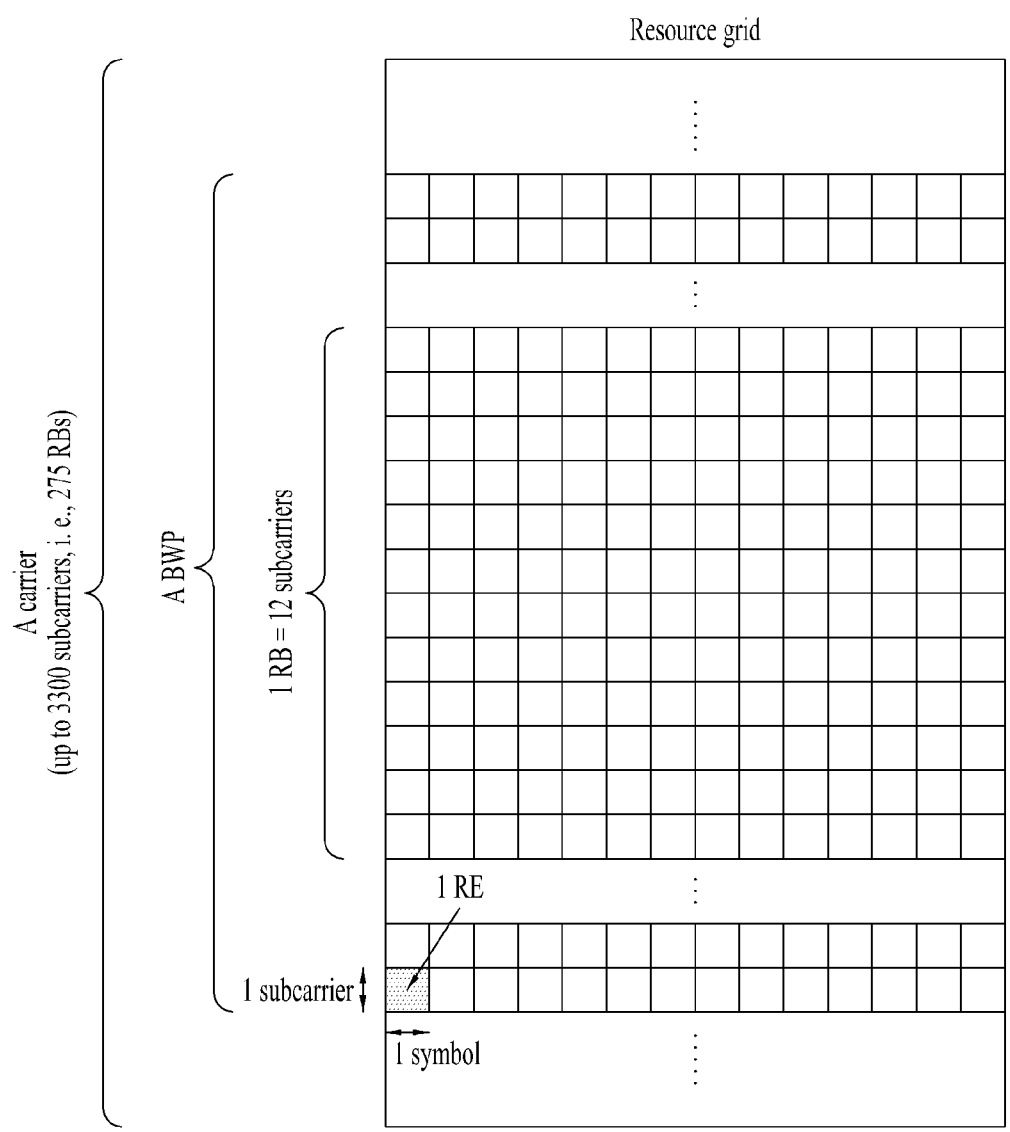

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
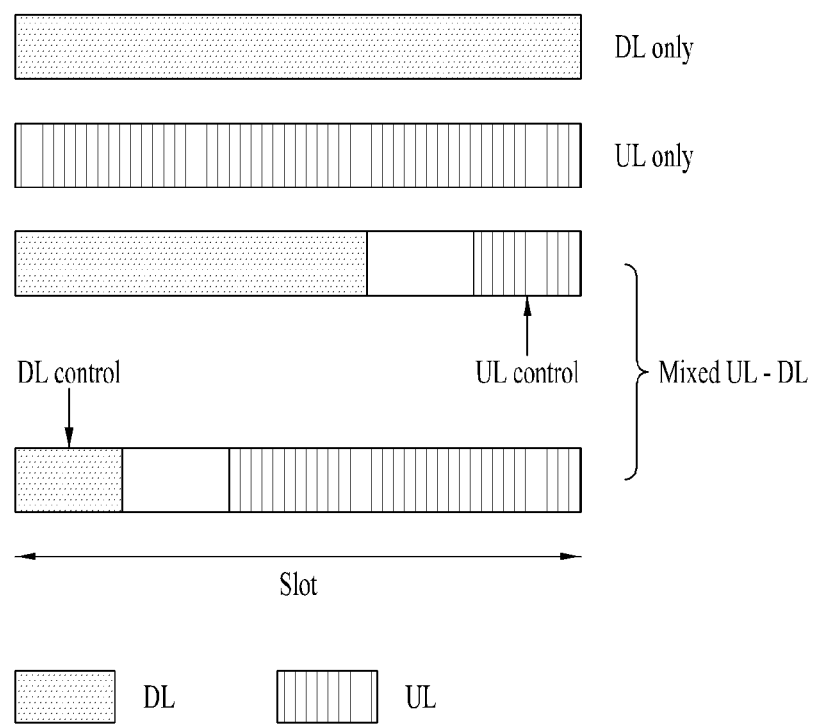

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region
DL control region+GP+UL region
DL region: (i) DL data region, (ii) DL control region+DL data region
UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

On the other hand, for an NR system under discussion, a technique of using an ultra-high frequency band (for example, a frequency band at or above 6 GHz) is considered in order to transmit data to a plurality of users at a high transmission rate in a wide frequency band. In 3GPP, the above-mentioned technology has been referred to as "NR". In the present disclosure, the term "NR" will hereinafter be referred to as an NR system. However, the ultra-high frequency band has the frequency property that a signal is attenuated too rapidly according to distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, the millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

Figure 6:
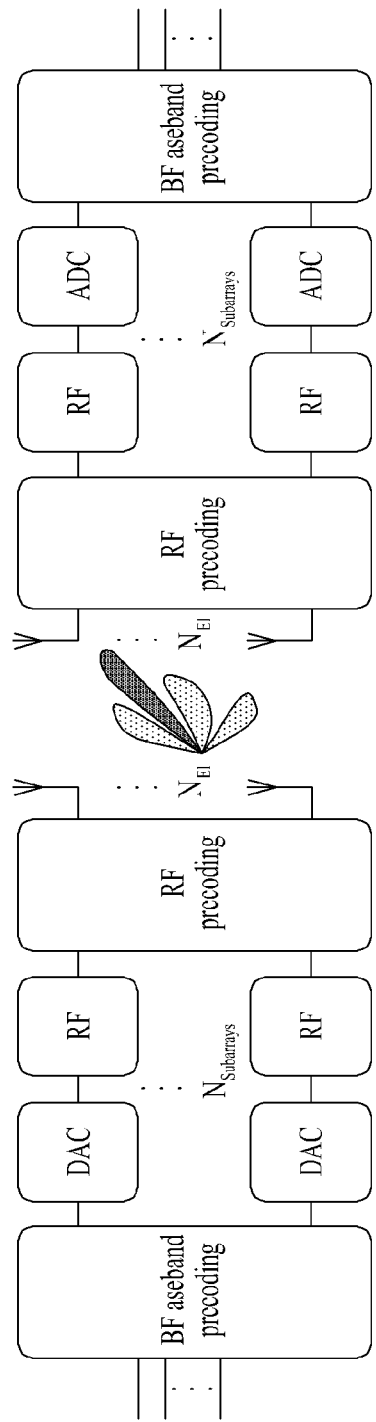
FIG. 6 is a diagram illustrating analog beamforming in the NR system.

FIG. 6 is a diagram schematically illustrating an exemplary hybrid BF structure from the perspective of transceiver units (TXRUs) and physical antennas according to the present disclosure.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of digital-to-analog (D/A) (or analog-to-digital (A/D)) converters. For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix. In FIG. 6, the number of digital beams is L and the number analog beams is N. Additionally, in the NR system to which the present disclosure is applicable, a BS designs analog BF to be changed in units of symbols to provide more efficient BF support to a UE located in a specific area. Furthermore, as illustrated in FIG. 6, when N specific TXRUs and M RF antennas are defined as one antenna panel, the NR system according to the present disclosure considers introducing a plurality of antenna panels to which independent hybrid BF is applicable. In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 7:
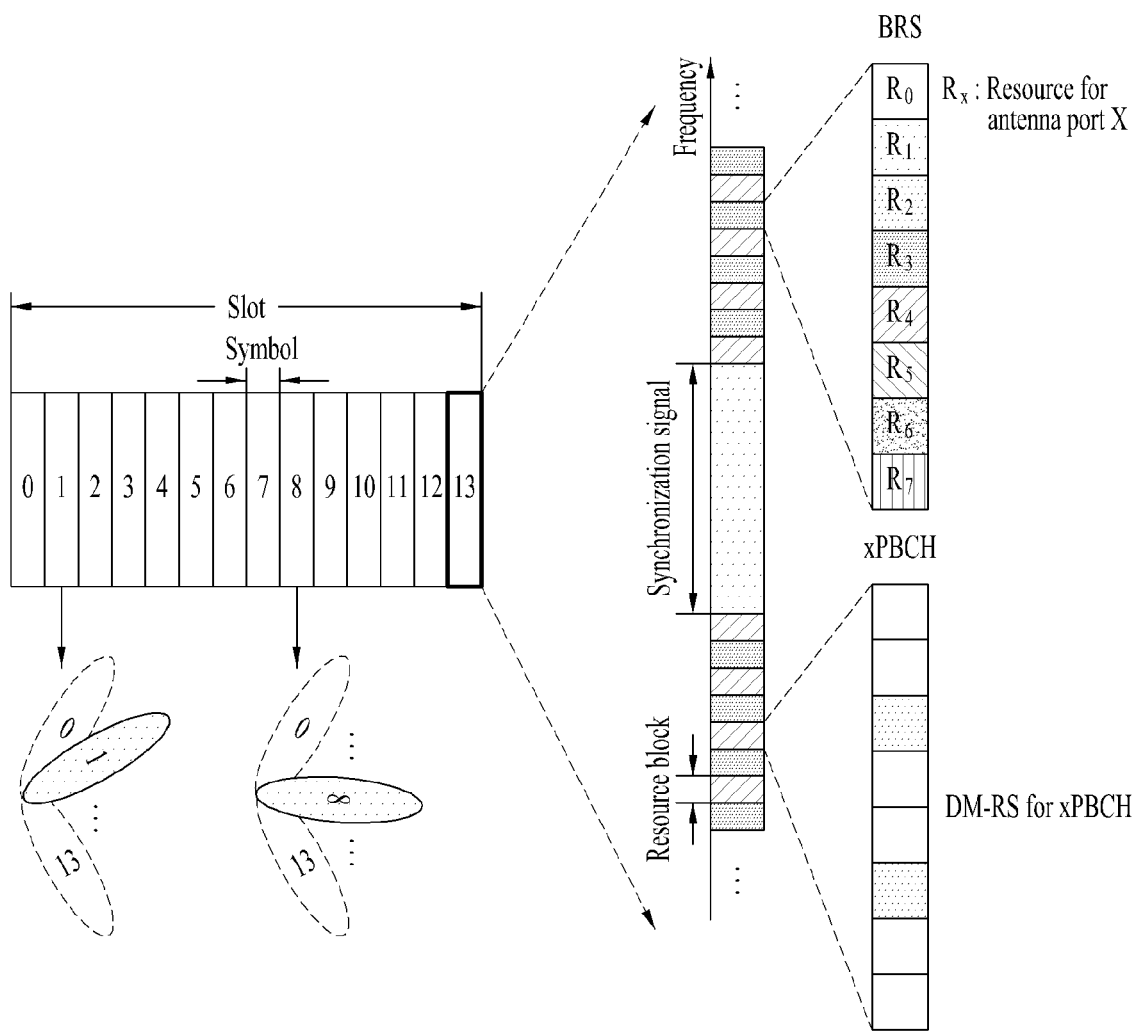
FIG. 7 is a diagram illustrating beam sweeping for a synchronization signal and system information in a downlink (DL) transmission process.
Figure 9:
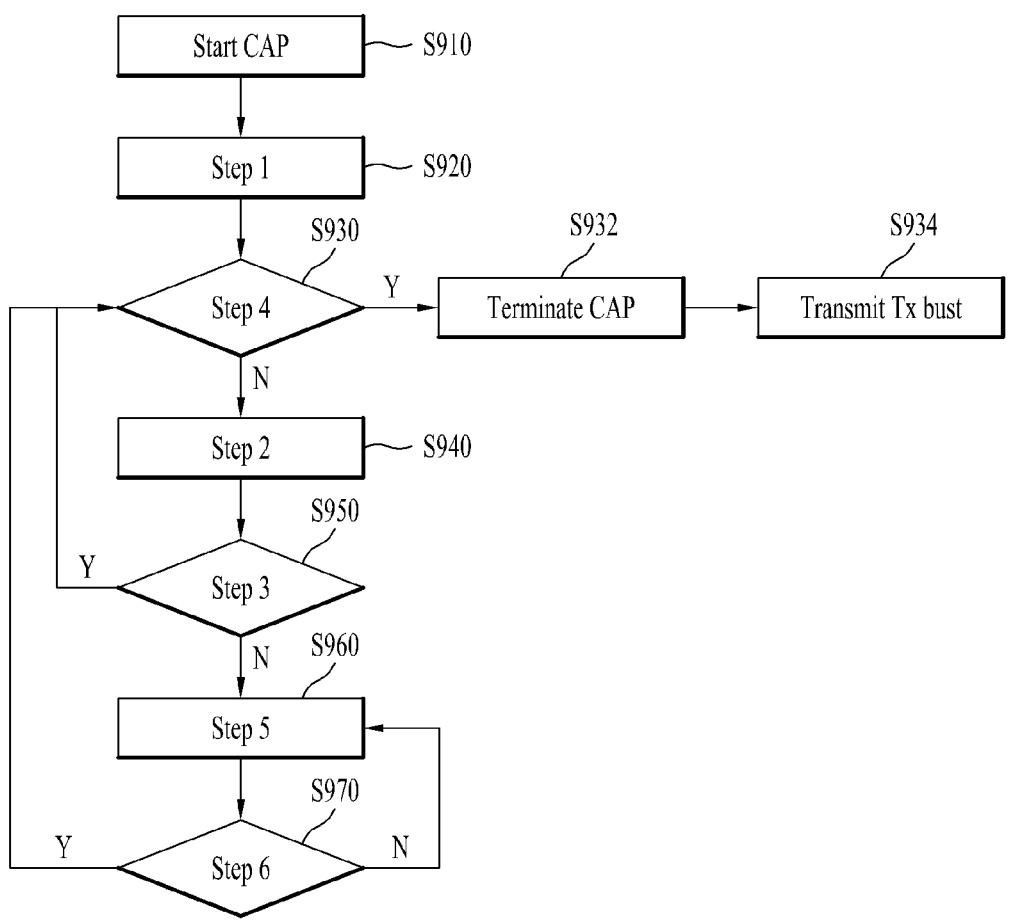

FIG. 7 is a diagram illustrating beam sweeping for an SS and system information in a DL transmission process. In FIG. 7, physical resources or a physical channel through which system information of a New RAT system is broadcast is referred to as xPBCH. Analog beams belonging to different antenna panels may be transmitted simultaneously in one symbol. As illustrated in FIG. 9, to measure the channel of each analog beam, introduction of an RS transmitted for a single analog beam corresponding to a specific antenna panel, known as a beam RS (BRS) is under discussion. The BRS may be defined for a plurality of antenna ports, and each of the antenna ports of the BRS may correspond to a single analog beam. Unlike the BRS, an SS or xPBCH may be transmitted for all analog beams of an analog beam group so that any UE may successfully receive the SS or xPBCH.

Transmission-Reception (Tx-Rx) Beam Association

To enable a UE to measure beams used in a corresponding cell or beams available to an eNB, the network may configure a known signal such as a measurement reference signal (MRS), a BRS, or a beamformed CSI-RS, to which each beam is applied. The known signals will be generically referred to as the BRS, for the convenience of description.

The eNB may transmit the BRS periodically or aperiodically, and the UE may select an eNB Tx beam suitable for the UE by measuring the BRS. When Rx beams of the UE are also considered, the UE may select a beam combination of an eNB Tx beam and a UE Rx beam by measuring different Rx beams. After this process, a Tx-Rx beam association between the eNB and the UE may be determined explicitly or implicitly.

1) Network Decision Based on Beam Association

The network may indicate to the UE to report top X Tx-Rx beam combinations determined based on measurements. The number of reported beam combinations may be predefined or indicated by higher-layer signaling from the network. Alternatively, all of beam combinations of which the measurements exceed a specific threshold may be reported.

The specific threshold may be predefined or signaled by the network. When each UE has different decoding performance, categories may be defined in consideration of the decoding performances of UEs and a threshold may be defined for each category.

Further, beam combinations may be reported periodically or aperiodically, upon request of the network. Otherwise, when a previous reported result is different from a current measurement result by a specific level or higher, event-triggered reporting may be performed. The specific level may be predefined or signaled by the network.

The UE may report one or more beam associations determined in the above-described manner. When a plurality of beam indexes are reported, priority levels may be assigned to beams. For example, the beam indexes may be reported such that the report is interpreted as a 1st preferred beam, a 2nd preferred beam, and so on.

2) UE Decision Based on Beam Association

In beam association-based UE decision, UE-preferred beams may be reported in the same manner as the above-proposed explicit beam association.

Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'gel-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

CSI Feedback

The 3GPP LTE(-A) system defines that a UE reports CSI to a BS. CSI generically refers to information representing the quality of a radio channel (or link) established between a UE and an antenna port. For example, the CSI may correspond to a rank indicator (RI), a precoding matrix indicator (PMI), and a channel quality indicator (CQI). The RI represents information about the rank of a channel, meaning the number of streams that the UE receives in the same time-frequency resources. Because the RI is determined depending on long-term fading of the channel, the UE generally feeds back the RI to the BS, with a longer periodicity than those of the PMI and the CQI. The PMI is a UE-preferred precoding index based on a metric such as signal-to-interference and noise ratio (SINR), reflecting a channel spatial property. The CQI represents the strength of the channel, which means a reception SINR that may be achieved when the BS uses the PMI.

In the 3GPP LTE(-A) system, the BS may configure a plurality of CSI processes for the UE and receive a report of CSI for each process. A CSI process includes a CSI-RS for measurement of the quality of a signal from the BS and CSI-interference measurement (CSI-IM) resources for interference measurement.

Radio Resource Management (RRM) Measurement in LTE

The LTE system supports RRM operations including power control, scheduling, cell search, cell reselection, handover, radio link or connection monitoring, and connection establishment/re-establishment. A serving cell may request RRM measurement information which is measurement values required for an RRM operation to the UE. Particularly, the UE may measure and report information about each cell, such as cell search information, reference signal received power (RSRP), and reference signal received quality (RSRQ) in the LTE system. Specifically, the UE receives 'measConfig' in a higher-layer signal for RRM measurement from the serving cell in the LTE system. Then the UE measures RSRP or RSRQ according to information included in 'measConfig'. TS 36.214 for the LTE system defines RSRP, RSRQ, and received signal strength indicator (RSSI) as follows.

RSRP: RSRP is defined as a linear average over the power contributions (in [W]) of REs that carry a cell-specific reference signal (CRS) within a measurement frequency bandwidth. For RSRP determination, CRS R0 according TS 36.211 is used. To increase reliability, CRS R1 may be used in addition to CRS R0 under circumstances. A reference point for the RSRP should be an antenna connector of a UE. When receive diversity is used, the reported RSRP value should not be lower than the RSRP of any of individual diversity branches.

RSRQ: RSRQ is defined as (N*RSRP)/(RSSI of E-UTRA carrier) where N is the number of RBs in the RSSI measurement bandwidth of the E-UTRA carrier. 'N*RSRP' and 'RSSI of E-UTRA carrier' are measured in the same RB set.

E-UTRA carrier RSSI is obtained as the linear average of the total received power observed only in OFDM symbols including reference symbols for antenna port 0 over N RBs from all sources, including co-channel serving and non-serving cells, adjacent channel interference, thermal noise, and so on.

If higher-layer signaling indicates a specific subframe for RSRP measurement, RSSI is measured over all indicated OFDM symbols. In this case, a reference point for the RSRQ should also be an antenna connector of a UE. When receive diversity is used, the RSRQ value should not be lower than the RSRQ of any of individual diversity branches.

RSSI: RSSI is the received wideband power, including thermal noise and noise generated within a bandwidth defined by a receiver pulse shaping filter. A reference point for the RSSI should be an antenna connector of a UE. When receive diversity is used, the reported RSSI value should not be lower than the RSSI of any of individual diversity branches.

According to the above definitions, a UE operating in the LTE system is allowed to measure RSRP in a bandwidth corresponding to one of 6, 15, 25, 50, 75, and 100 RBs by an allowed measurement bandwidth-related information element (IE) in system information block type 3 (SIB3) in the case of intra-frequency measurement. In the case of inter-frequency measurement, the UE is allowed to measure RSRP in a bandwidth corresponding to one of 6, 15, 25, 50, 75, and 100 RBs by an allowed measurement bandwidth-related IE in system information block type 5 (SIB5). Without the IE, the UE may measure RSRP in a total DL system frequency band by default. When the UE receives an allowed measurement bandwidth, the UE may measure RSRP freely within the corresponding value, considering the corresponding value to be a maximum measurement bandwidth.

However, when the serving cell transmits an IE defined as WB-RSRQ and sets an allowed measurement bandwidth to 50 or more RBs, the UE should calculate an RSRP value for a total allowed measurement bandwidth. In regards to RSSI, the UE measures RSSI in a frequency band that the receiver of the UE has according to the definition of an RSSI bandwidth.

The NR communication system is required to support much better performance than the legacy 4th generation (4G) system in terms of data rate, capacity, latency, energy consumption, and cost. Accordingly, the NR system needs to achieve great improvement in bandwidth, spectral energy, signaling efficiency, and cost per bit.

Beam Failure Recovery (BFR) Process

In a beamforming system, radio link failure (RLF) may occur frequently due to rotation or movement of a UE or beamforming blockage. Therefore, NR supports BFR to prevent frequent RLF occurrences. BFR is similar to RLF recovery and may be supported when the UE has knowledge of new candidate beam(s).

For beam failure detection, the BS configures an RS for beam failure detection for the UE. When the number of beam failure indications from the physical layer of the UE reaches a threshold set by RRC signaling within a period set by RRC signaling from the BS, the UE declares beam failure.

After detecting the beam failure, the UE triggers BFR by initiating a random access procedure on a PCell and performs BFR by selecting a suitable beam (if the BS has provided dedicated random access resources for certain beams, these are prioritized by the UE). Upon completion of the random access procedure, the UE considers that the BFR has been completed.

Figure 8:
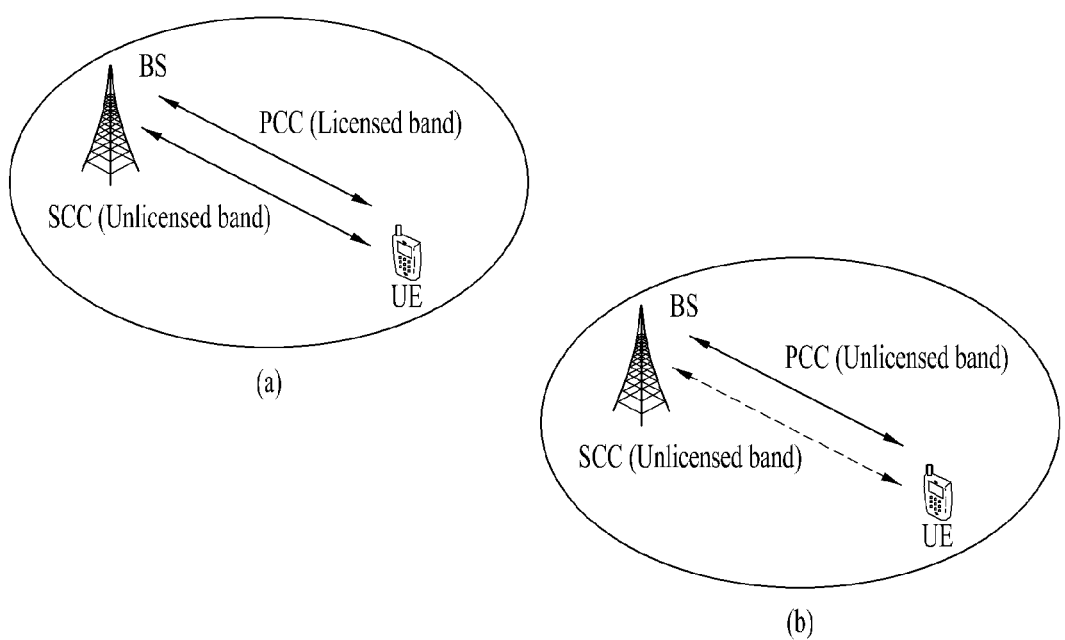
FIGS. 8, 9 and 10 are diagrams illustrating UL channel transmission DL channel transmission in an unlicensed band.

FIG. 8 illustrates an exemplary wireless communication system supporting an unlicensed band, which is applicable to the present disclosure.

In the following description, a cell operating in a licensed band (hereinafter, referred to as an L-band) is defined as an L-cell, and the carrier of an L-cell is defined as a (DL/UL) LCC. Further, a cell operating in an unlicensed band (hereinafter, referred to as a U-band) is defined as a U-cell and the carrier of a U-cell is defined as a (DL/UL) UCC. The carrier/carrier-frequency of a cell may refer to the operating frequency (e.g., center frequency) of the cell. A cell/carrier (e.g., component carrier (CC)) is genetically referred to as a cell.

When a UE and a BS transmit and receive signals in a carrier-aggregated LCC and UCC as illustrated in FIG. 8(a), the LCC may be configured as a primary CC (PCC) and the UCC may be configured as a secondary CC (SCC). As illustrated in FIG. 8(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

The NR frame structure of FIG. 3 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

To transmit a DL signal in an unlicensed band, the BS may indicate the configuration of OFDM symbols used in subframe #n to the UE by signaling. The term subframe may be replaced with slot or time unit (TU).

Specifically, in an LTE system supporting an unlicensed band, the UE may assume (or identify) the configuration of OFDM symbols occupied in subframe #n by a specific field (e.g., a Subframe configuration for LAA field or the like) in DCI received in subframe #n−1 or subframe #n from the BS.

Table 3 describes a method of indicating the configuration of OFDM symbols used for transmission of a DL physical channel and/or physical signal in a current and/or next subframe by the Subframe configuration for LAA field in the LTE system.

TABLE 3

| Value of 'Subframe configuration for LAA' field in current subframe | Configuration of occupied OFDM symbols (current subframe, next subframe) |
| --- | --- |
| 0000 | (-,14) |
| 0001 | (-,12) |
| 0010 | (-,11) |
| 0011 | (-,10) |
| 0100 | (-,9) |
| 0101 | (-,6) |
| 0110 | (-,3) |
| 0111 | (14,*) |
| 1000 | (12,-) |
| 1001 | (11,-) |
| 1010 | (10,-) |
| 1011 | (9,-) |
| 1100 | (6,-) |
| 1101 | (3,-) |
| 1110 | reserved |
| 1111 | reserved |

NOTE:
- (-, Y) means UE may assume the first Y symbols are occupied in next subframe and other symbols in the next subframe are not occupied.- (X, -) means UE may assume the first X symbols are occupied in current subframe and other symbols in the current subframe are not occupied.- (X, *) means UE may assume the first X symbols are occupied in current subframe, and at least the first OFDM symbol of the next subframe is not occupied.

For UL signal transmission in an unlicensed band, the BS may indicate a UL transmission period to the UE by signaling.

Specifically in the LTE system supporting an unlicensed band, the UE may obtain 'UL duration' and 'UL offset' information for subframe #n from a 'UL duration and offset' field in detected DCI.

Table 4 illustrates a method of indicating the configuration of a UL offset and a UL duration by the UL duration and offset field in the LTE system.

TABLE 4

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, if the UL duration and offset field configures (or indicates) UL offset 1 and UL duration d for subframe #n, the UE does not need to receive a DL physical channel and/or physical signal in subframe #(n+1+i) (where i=0, 1, . . . , d−1).

The BS may perform one of the following unlicensed band access procedures (e.g., channel access procedures (CAPs)) to transmit a DL signal in the unlicensed band.

(1) First DL CAP Method

FIG. 9 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S910). The BS may randomly select a backoff counter N within a contention window (CW) according to step 1. N is set to an initial value Ninit (S920). Ninit is a random value selected from the values between 0 and CWp. Subsequently, when the backoff counter value N is 0 according to step 4 (S930; Y), the BS terminates the CAP (S932). The BS may then perform a Tx burst transmission including transmission of a PDSCH/PDCCH/EPDCCH (S934). On the contrary, when the backoff counter value N is not 0 (S930; N), the BS decrements the backoff counter value by 1 according to step 2 (S940). Subsequently, the BS checks whether the channel of U-cell(s) is idle (S950). If the channel is idle (S950; Y), the BS determines whether the backoff counter value is 0 (S930). On the contrary, when the channel is not idle, that is, the channel is busy (S950; N), the BS determines whether the channel is idle during a longer defer duration Td (25 usec or longer) than a slot duration (e.g., 9 usec) according to step 5 (S960). If the channel is idle during the defer duration (S970; Y), the BS may resume the CAP. The defer duration may include a 16-usec duration and the immediately following mp consecutive slot durations (e.g., each being 9 usec). On the contrary, if the channel is busy during the defer duration (S970; N), the BS re-checks whether the channel of the U-cell(s) is idle during a new defer duration by performing step S960 again.

Table 5 illustrates that mp, a minimum CW, a maximum CW, a maximum channel occupancy time (MCOT), and an allowed CW size applied to a CAP vary according to channel access priority classes.

TABLE 5

| Channel Access Priority Class (p) | $m_p$ | $CW_{min,p}$ | $CW_{max,p}$ | $T_{ulcot,p}$ | Allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |

TABLE 5-continued

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1ms, the BS may transmit a DL signal (e.g., a signal including a discovery signal without a PDSCH) in the unlicensed band immediately after sensing the channel to be idle for at least a sensing duration Tdrs=25 us. Tdrs includes a duration Tf (=16 us) following one sensing slot duration Tsl (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining Ninit for a specific carrier.

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 10:
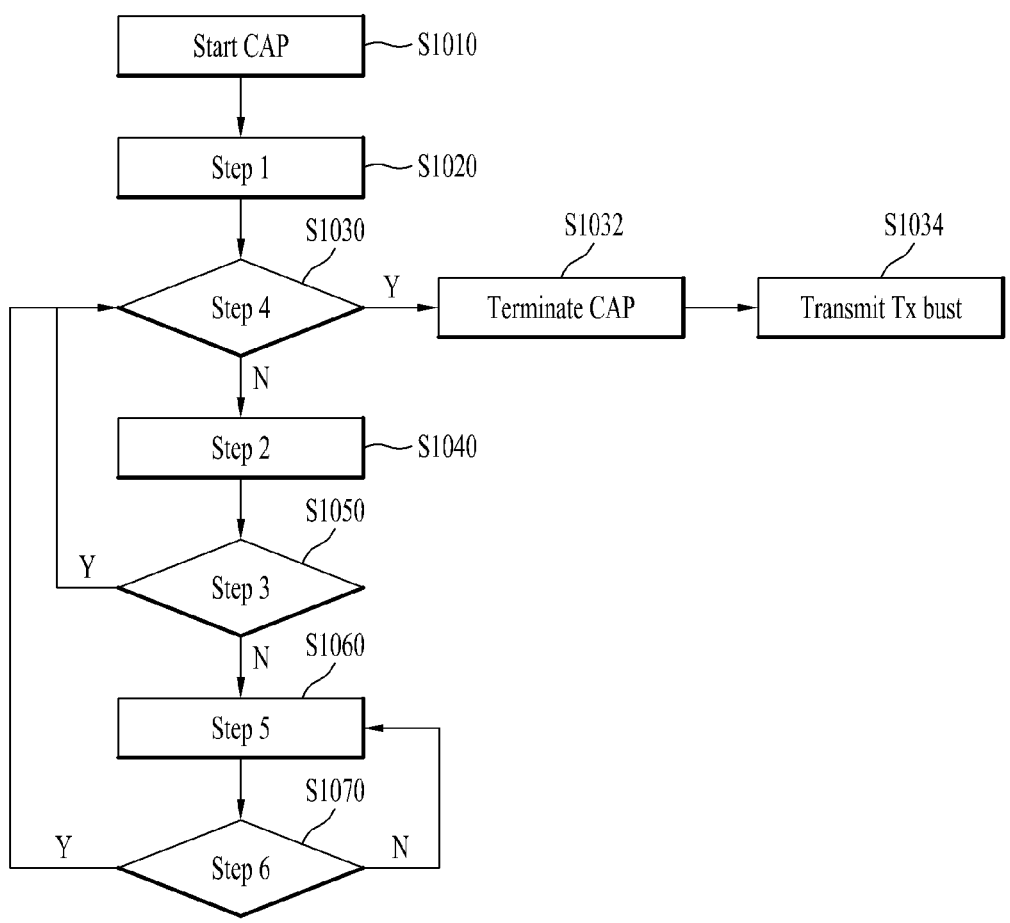

FIG. 10 is a flowchart illustrating UE's Type 1 CAP operation for UL signal transmission.

To transmit a signal in the U-band, the UE may initiate a CAP (S1010). The UE may randomly select a backoff counter N within a contention window (CW) according to step 1. In this case, N is set to an initial value Ninit (S1020). Ninit may have a random value between 0 and CWp. If it is determined according to step 4 that the backoff counter value (N) is 0 (YES in S1030), the UE terminates the CAP (S1032). Then, the UE may perform Tx burst transmission (S1034). If the backoff counter value is non-zero (NO in S1030), the UE decreases the backoff counter value by 1 according to step 2 (S1040). The UE checks whether the channel of U-cell(s) is idle (S1050). If the channel is idle (YES in S1050), the UE checks whether the backoff counter value is 0 (S1030). On the contrary, if the channel is not idle in S1050, that is, if the channel is busy (NO in S1050), the UE checks whether the corresponding channel is idle for a defer duration Td (longer than or equal to 25 usec), which is longer than a slot duration (e.g., 9 usec), according to step 5 (S1060). If the channel is idle for the defer duration (YES in S870), the UE may resume the CAP. Here, the defer duration may include a duration of 16 usec and mp consecutive slot durations (e.g., 9 usec), which immediately follows the duration of 16 usec. If the channel is busy for the defer duration (NO in S1070), the UE performs step S1060 again to check whether the channel is idle for a new defer duration.

Table 6 shows that the values of mp, a minimum CW, a maximum CW, an MCOT, and allowed CW sizes, which are applied to the CAP, vary depending on channel access priority classes.

TABLE 6

| Channel Access Priority Class (p) | $m_p$ | $CW_{min,p}$ | $CW_{max,p}$ | $T_{ulm\,cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3, 4, $T_{ulmcot,p}$ = 10 ms if the higher layer parameter 'absenceOfAnyOtherTechnology-r14' indicates TRUE, otheriwse, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set CWp to CWmin, p for every priority class p∈{1, 2, 3, 4}. Otherwise, the UE may increase CWp for every priority class p∈{1,2,3,4} to a next higher allowed value.

A reference subframe (or reference slot) nref may be determined as follows.

When the UE receives a UL grant in a subframe (or slot) ng and performs transmission including a UL-SCH, which has no gaps and starts from a subframe (or slot) n0, in subframes (or slots) $n_0, n_1, \ldots, n_w$ (here, the subframe (or slot) nw is the most recent subframe (or slot) before a subframe ng-3 in which the UE has transmitted the UL-SCH based on the Type 1 CAP), the reference subframe (or slot) nref may be the subframe n0.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period Tshort_ul of 25 us. Tshort_ul includes a duration Tf of 16 us immediately followed by one slot duration Tsl of 9 us. Tf includes an idle slot duration Tsl at the start thereof.

Figure 11:
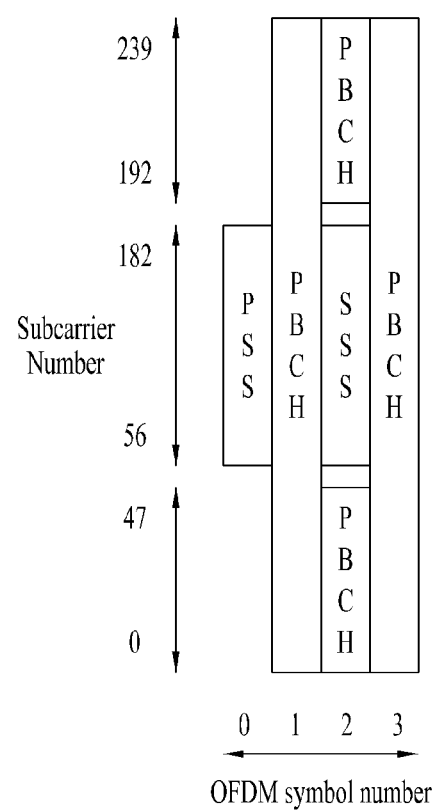
FIGS. 11 to 14 are diagrams illustrating a structure and transmission method of a synchronization signal (SS)/physical broadcast channel (PBCH) block used in the NR system.

FIG. 11 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 11, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 7 below.

TABLE 7

| | Type of Signals | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 12:
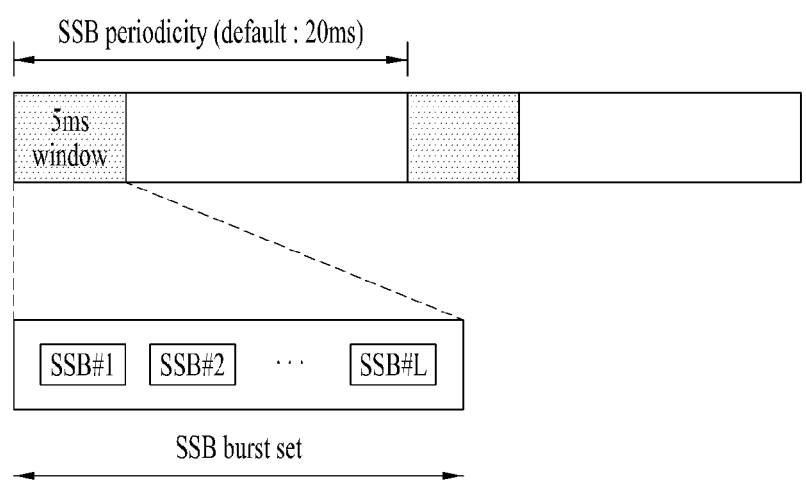

FIG. 12 illustrates SSB transmission. Referring to FIG. 12, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 13:
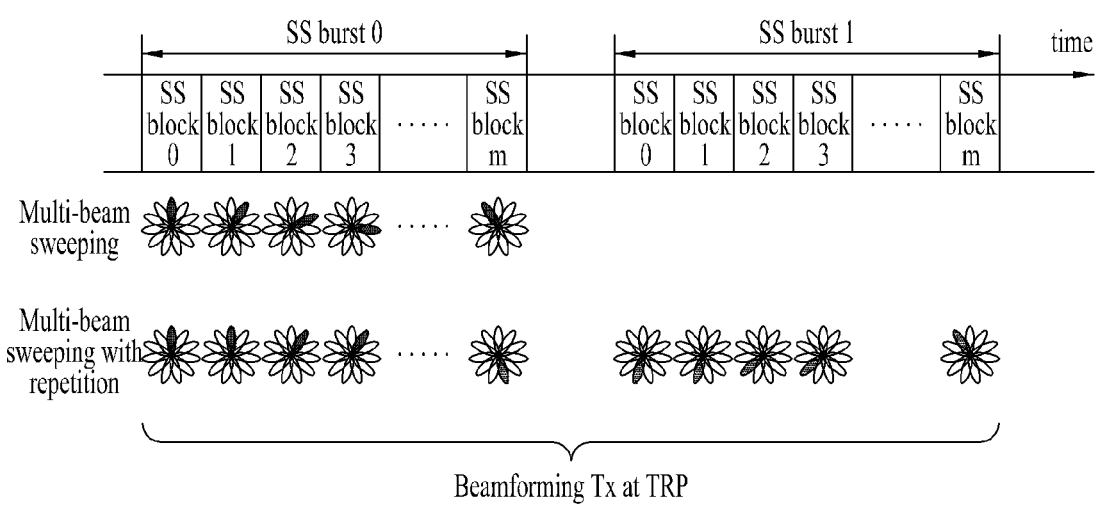

FIG. 13 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Figure 14:
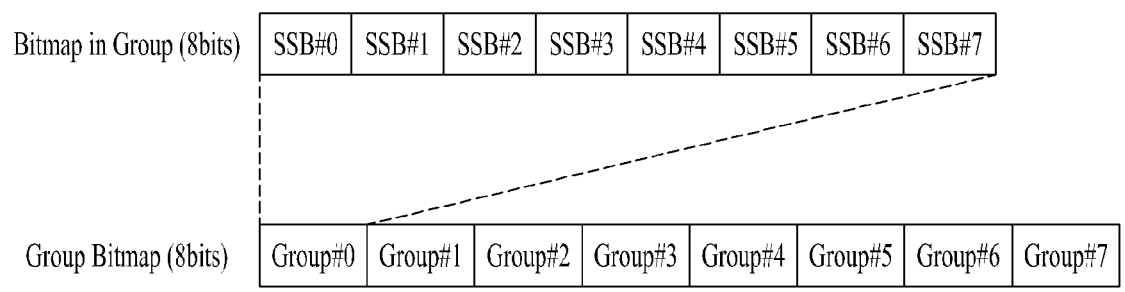

FIG. 14 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

- If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.
- If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

In the legacy NR system, the user equipment (UE) may measure the magnitude or quality of signals received from a neighbor cell using SS/PBCH blocks or CSI-RS, and may report the measurement result to the base station (BS). In general, Reference Signal Received Power (RSRP) may be used as a value for measuring the magnitude of signals, and Reference Signal Received Quality (RSRQ) or Signal-to-Interference plus oise Ratio (SINR) may be used as a value for measuring the quality of signals.

The BS may determine a cell to be camped on by referring to the magnitude and quality of per-cell signals or per-beam signals received therein. If necessary, the BS may instruct the UE to be handed over to an appropriate cell through a handover command.

In this case, in order to measure RSRP of the UE, the BS may pre-define the SS/PBCH block and the CSI-RS acting as reference signals, or may transmit the SS/PBCH block and the CSI-RS at a time point that is set by the BS.

Therefore, if the UE recognizes the presence of a cell and then receives resource information of either the SS/PBCH block or the CSI-RS, the UE may measure the RSRP value based on the received resource information, and may report the measurement result to a higher layer. In this case, if no signals are detected because the magnitude of signals transmitted through the corresponding cell is very small and the signal quality is not good, the UE may report the absence of signals detected by the corresponding cell, so that this UE reporting may enable the higher layer to perform filtering.

For convenience of description and better understanding of the present disclosure, the SS/PBCH block and the CSI-RS will hereinafter be generically referred to as RRM-RS (Radio Resource Measurement-Reference Signal).

In the case where the NR system (hereinafter referred to as NR-U system) operates in the unlicensed band, in order for the NR system to coexist with another RAT such as Wi-Fi in the same frequency band, the NR-system may perform channel clearance assessment (CCA) that determines whether the corresponding frequency band is being used in advance by another RAT or other enterprise network prior to transmission of signals. Thereafter, when a channel is occupied, no signals are transmitted. Only when the channel is occupied, signals can be transmitted. This signal transmission/non-transmission may be referred to as LBT (Listen Before Talk).

The NR-U system may perform the LBT procedure for signal transmission, such that the LBT procedure can also be performed on a reference signal (RS) for RRM measurement. Therefore, when another system located around the BS occupies the channel in advance, the UE has to perform measurement for the neighbor cell without recognizing whether RRM-RS required for neighbor cell measurement has been transmitted.

Therefore, despite the fact that the RRM-RS has not yet been transmitted by LBT, the UE may determine the magnitude and quality of the measured RRM-RS to correspond to a state of non-detection of RRM-RS. In other words, although RRM-RS is not actually transmitted by LBT, the UE may assume that RRM-RS has already been transmitted and may determine that the magnitude and quality of RRM-RS are not good because RRM-RS is not detected.

That is, assuming that RRM-RS was actually transmitted through a good link between the cell and the UE, if a frequency required for RRM-RS transmission is occupied by another RAT such as Wi-Fi so that it is impossible to transmit RRM-RS even though the magnitude and quality of RRM-RS can be measured as superior measurement values, the UE may not recognize that RRM-RS was not transmitted due to frequency occupancy of another RAT. Therefore, although a current state occurs by RRM-RS non-transmission, the UE may misunderstand that the link between the cell and the UE is not good, so that unexpected errors may occur in RRM measurement decision.

However, in a state in which the magnitude and quality of signals are good differently from the above-mentioned UE determination, if incorrect information indicating that the magnitude and quality of signals are not good is reported to a higher layer, the result of filtering in the higher layer can cause unexpected errors in the actual magnitude and quality of signals. As a result, a time delay may occur in the process of reporting the magnitude and quality of RRM-RS to the BS, or errors may occur in information about the magnitude and quality of reported RRM-RS.

Therefore, in order to address the above issues, the UE should determine the fact that RRM-RS was not transmitted by LBT and should report the result of determination to the higher layer. In addition, the higher layer should not perform L3 filtering of the measurement value corresponding to the RRM-RS that was not transmitted by LBT.

In addition, an error may occur in the process of acquiring information about the LBT operation of the cell. In this case, in the same manner as in the case in which the UE reports, to the higher layer, the magnitude and quality of RRM-RS regardless of the actual LBT operation of the BS, a time required for reporting the quality of signals may be unexpectedly delayed.

Therefore, in a situation in which the cell does not transmit RRM-RS due to LBT, the present disclosure can provide a method for enabling the UE to recognize RRM-RS non-transmission, and can provide UE operations based on the method.

Figure 15:
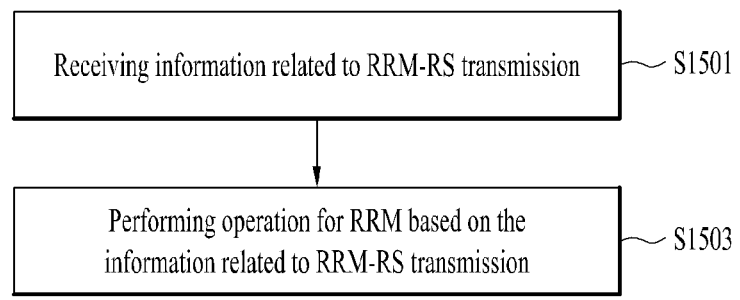
FIG. 15 is a flowchart illustrating operations of a user equipment (UE) according to a first embodiment.

FIG. 15 is a flowchart illustrating UE operations according to the present disclosure. Referring to FIG. 15, the UE may receive information related to RRM-RS transmission. In this case, information related to RRM-RS transmission can be defined according to a first embodiment (Embodiment 1) (S1501). In addition, according to a second embodiment (Embodiment 2), a signal or channel to be used for transmission and reception of the information related to RRM-RS transmission may utilize signals and/or Downlink Control Information (DCI) that are transmitted based on a sequence within a Physical Broadcast Channel (PBCH) payload and an SMTC (SS/PBCH Block Measurement Time Configuration) window.

The UE having received information related to RRM-RS transmission can perform a specific operation for at least one RRM selected from among examples described in a third embodiment (Embodiment 3) based on information related to RRM-RS transmission (S1503).

Figure 16:
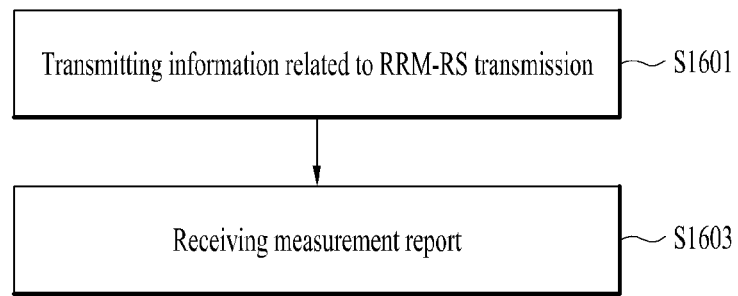
FIG. 16 is a flowchart illustrating operations of a base station (BS) according to a second embodiment.

FIG. 16 is a flowchart illustrating BS operations according to the present disclosure. Referring to FIG. 16, the BS may transmit information related to RRM-RS transmission to the UE. In this case, the information related to RRM-RS transmission can be defined according to the first embodiment (Embodiment 1) (S1601). The BS can transmit and receive information related to RRM-RS transmission using signals or channels of the second embodiment (Embodiment 2).

The BS can receive the resultant value measured using the RRM-RS from the UE (S1603). However, step S1603 is not always performed, and step S1603 can be performed only in the case where the UE decides to transmit information about the measurement result of the neighbor cell according to the third embodiment (Embodiment 3). In addition, the BS can receive the RRM-RS based measurement result (S1603), and can perform necessary information according to the third embodiment (Embodiment 3). For example, according to the third embodiment (Embodiment 3), the UE can perform various operations such as handover, redirection, or the like.

Figure 17:
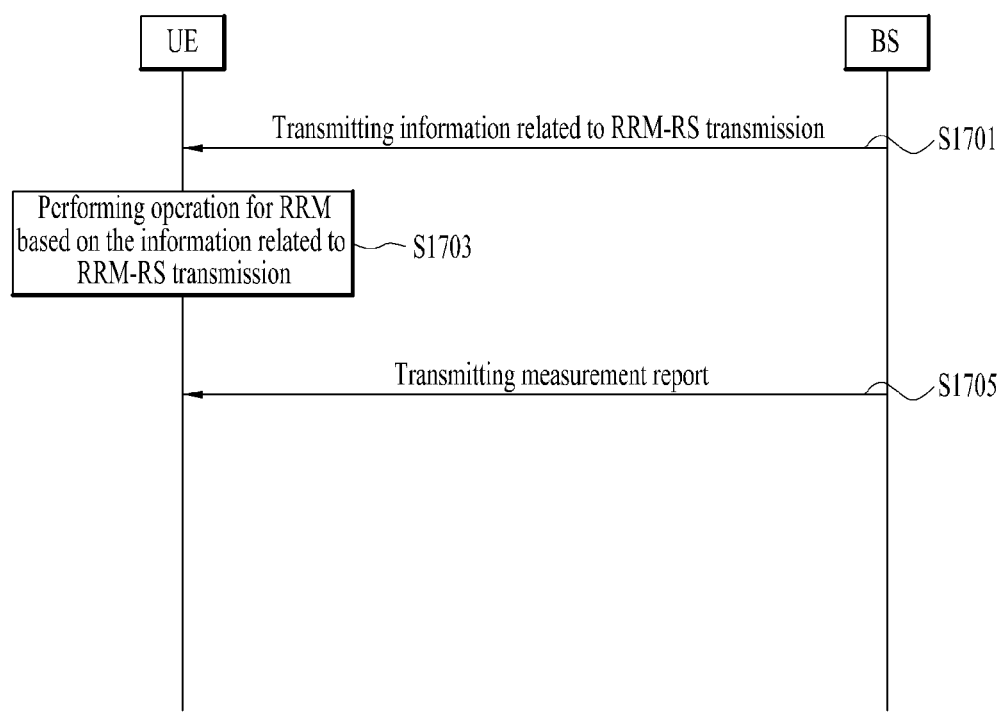
FIG. 17 is a flowchart illustrating operations of a network according to a third embodiment.

FIG. 17 is a flowchart illustrating operations of the network according to the present disclosure. Referring to FIG. 17, the BS can transmit information related to RRM-RS transmission of the first embodiment (Embodiment 1) using signals and channels of the second embodiment (Embodiment 2) (S1701).

The UE can perform RRM-related operation based on the information related to RRM-RS transmission. This RRM-related operation can be performed based on the third embodiment (Embodiment 3) (S1703). If necessary, the UE can report the RRM measurement result to the BS (S1705).

Embodiment 1: Transmission of Information Related to LBT Operation & Statistics for LBT Operation In order to address the above issues, the present disclosure provides a method for enabling the BS to transmit information about RRM-RS transmission delay caused by LBT to the UE. That is, the BS may transmit, to the UE, information about RRM-RS transmission delay caused by LBT through another signal instead of the RRM-RS in the same manner as a separate signal transmitted within an SMTC window in which either a signal defined in the RRM-RS or the SS/PBCH block is transmitted, so that the BS can recognize whether the RRM-RS is transmitted by LBT in the same manner as in a PBCH payload defined in the SS/PBCH block.

Meanwhile, information about RRM-RS transmission delay can be descried as follows.

1) Embodiment 1-1: Information about the Number of RRM-RS Transmission Times

The BS may define a transmission (Tx) counter, and may increase a count value of the transmission (Tx) counter whenever RRM-RS is transmitted after passing through the LBT procedure. The BS can transmit information about the increased Tx counter to the UE.

For example, the Tx counter of 3 bits may be defined, and the count value of the Tx counter may increase by one whenever RRM-RS transmission is successful. If RRM-RS transmission is successful after the count value of the Tx counter is set to 7, the value of the Tx counter can return to zero '0'.

In this case, if the UE determines that RRM-RS was transmitted based on the result of measuring the magnitude and quality of signals, a count value of the reception (Rx) counter may increase, and the UE can acquire information about the Tx counter. Then, if the count value of the Rx counter is identical to the count value of the Tx counter, the UE can determine that there is no detection error in the LBT operation.

However, if the count value of the Rx counter is not identical to the count value of the Tx counter, the UE may determine that there is a detection error in the LBT operation, and may correct the filtering result obtained from the higher layer using values indicating the magnitude and quality of signals that have been measured in advance. Independent of correction of the filtering result, the UE may also use the result of determining whether the count value of the Rx counter is identical to or different from the count value of the Tx counter to correct parameters of determining the LBT operation and result of the BS. Meanwhile, correction of such parameters can increase the accuracy of information indicating whether the LBT procedure was performed.

In addition, the UE can obtain the statistical result related to RRM-RS transmission delay caused by LBT using information related to the above LBT operation. As discussed below, the UE may use the above-mentioned statistics to determine the cell or frequency band to be camped on.

On the other hand, in order for the UE to correctly analyze Tx counter information received from the BS, there is a need for a transmission cycle of the RRM-RS to be pre-recognized by the UE. However, the measurement cycle of RRM-RS that was transmitted to the UE may be different from the transmission (Tx) cycle of RRM-RS that was actually transmitted by the BS.

In this case, while the UE performs RRM-RS measurement, the Tx counter value received by the UE may increase up to a value exceeding the UE expected range. Therefore, there is a need for the BS to inform the UE of the RRM transmission cycle together with the RRM-RS based measurement cycle so as to remove ambiguity of UE operations. In this case, the RRM-RS based measurement cycle may be an SMTC window cycle in the NR system, and the RRM-RS transmission cycle may be the counting cycle of the Tx counter.

As described above, assuming that the UE has already recognized the RRM-RS measurement cycle and the RRM-RS transmission cycle, the UE can predict the transmission (Tx) counter value of the RRM-RS. For example, if the SMTC window has the cycle of 40 ms and the counting cycle of the Tx counter is set to 20 ms, it is assumed that RRM-RS transmission has dropped by the LBT operation in the UE process of measuring RSRP within the SMTC window. In this case, assuming that the RSRP is measured within the next SMTC window and the Tx counter value corresponding to the RSRP measurement result is then obtained, if the Tx counter value is set to 4, it can be determined that the dropping prediction caused by LBT is incorrect. If the Tx counter value is less than 4, it can be determined that the dropping prediction caused by LBT is correct.

However, in this case, the UE may predict that RRM-RS transmission has dropped by LBT during the RSRP measurement process. Thereafter, even if the actual Tx counter value is set to 4, it may be unclear whether RRM-RS to be transmitted within a UE-configured SMTC window has dropped. To this end, the UE can read the Tx counter value in response to the actual RRM-RS transmission (Tx) cycle, and can definitely confirm whether RRM-RS has dropped within the UE-configured SMTC window.

Therefore, not only bitmap information indicating whether RRM-RS corresponding to the counting cycle of the Tx counter was transmitted, but also information about the Tx counter can be transmitted to the UE. Otherwise, such bitmap information instead of Tx counter information can also be transmitted to the UE. In this case, when the UE measures RRM-RS within the SMTC window, the UE reads bitmap information related to transmission or non-transmission of the received RRM-RS, so that the UE can more correctly recognize transmission or non-transmission of RRM-RS. As a result, the UE may perform correction or optimization operation of the measurement result described above.

2) Embodiment 1-2: Delivery of Statistical Information Indicating Whether RRM-RS Transmission for RRM-RS or the Entire DL Burst is Delayed Transmission of information about the Tx counter described in Embodiment 1-1 aims to determine the presence or absence of a detection error in the LBT operation, aims to correct the magnitude and quality of signals filtered by the higher layer, or aims to optimize parameters for determining the LBT operation.

However, in order to perform either cell selection or frequency selection using RRM-RS transmission delay statistics caused by LBT, the BS may transmit, to the UE, statistical information of RRM-RS transmission delay or successful RRM-RS transmission about the total downlink (DL) transmission opportunity (i.e., DL burst) including RRM-RS transmission caused by LBT during a predetermined time, instead of transmitting the transmission (Tx) counter information about RRM-RS to the UE, so that the UE can use the received statistical information.

Of course, the BS may transmit the transmission (Tx) counter value about the RRM-RS to the UE, and the UE may calculate the statistical value using the received Tx counter value. However, the Tx counter can be used to calculate overall statistics only when a transmission (Tx) time of the signal such as the RRM-RS already known to the UE.

Therefore, if the BS enables the UE to use the LBT success probability for the entire downlink (DL) burst in cell selection or frequency selection, it may be difficult for the BS to use the Tx counter for RRM-RS according to Embodiment 1-1. In addition, if LBT parameters for the RRM-RS between the BS and the UE are different from each other, there is a difference in LBT-related statistics between the BS and the UE. Also, if the RRM-RS transmission cycle is too long, the time required to calculate the statistics is excessively delayed, so that the transmission (Tx) counter dedicated to the RRM-RS may be considered unsuitable for calculating the statistics.

Accordingly, the BS may define the probability of RRM-RS transmission caused by successful LBT (or RRM-RS transmission caused by LBT failure) or the probability of DL burst transmission caused by successful LBT (or RRM-RS transmission delay caused by LBT failure), and may directly transmit information about the defined probabilities to the UE. At this time, information related to the probability of LBT-caused delay can be transmitted to a limited number of bits through quantization.

Embodiment 2: Channel or Signal for Transmitting Information about the LBT Operation and Statistical Information about the LBT Operation The statistical information for the LBT operation or the Tx counter value for the LBT operation, which have already been acquired by the BS, should be transmitted to the UE through a proper channel or signal. The statistical information or the Tx counter value for the LBT operation can be transmitted through different channels according to information characteristics. Accordingly, according to Embodiment 2, the channel or signal for transmitting the statistical information about the LBT operation can be defined.

1) Embodiment 2-1: Information Delivery Using PBCH Payload

SS/PBCH block from among RRM-RS information may be used for time-frequency synchronization, so that the SS/PBCH block has been widely used as a basic signal for RRM. In particular, the SS/PBCH block for RRM measurement may be transmitted in the SMTC window configured by the BS. This SMTC-based signal transmission may have higher priority in a signal transmission caused by LBT, so that the statistical information for the LBT operation or the Tx counter information for the LBT operation can be easily transmitted.

Specifically, when the Tx counter for the SS/PBCH block is transmitted, it may be possible to acquire the Tx counter information through a PBCH at a specific time where RRM measurement is performed using the SS/PBCH block, so that this information acquisition operation may be considered suitable for transmitting the Tx counter for the SS/PBCH block. However, transmitting the statistical information and/or the Tx counter through the PBCH payload has disadvantages in that PBCH decoding should always be performed in the RRM measurement process.

2) Embodiment 2-2: Definition of Signals Using Sequences within SMTC Window

Whenever there is a need to transmit information using the PBCH payload according to Embodiment 2-1, PBCH decoding should be performed. Therefore, a separate signal for transmitting the statistical information and/or the Tx counter value can be defined in the SMTC window. In addition, in order to avoid the problem of increasing decoding complexity in the same manner as in PBCH, the separate signal can be defined as a signal that uses a sequence such as CSI-RS or DM-RS.

In this case, the UE may detect the statistical information about the LBT operation or the Tx counter information about the LBT operation through correlation of a plurality of sequences.

Signals are constructed using sequences according to Embodiment 2-2. When a channel for transmitting system information such as RMSI (Remaining Minimum System Information) or OSI (Other System Information) within the SMTC window is defined, DM-RS such as PDCCH or PDSCH for either RMSI or OSI may be used as a signal for transmitting the statistical information and/or the Tx counter shown in Embodiment 2-2, resulting in reduction in system overhead. On the other hand, according to Embodiment 2-2, when the UE receives the PDCCH or PDSCH, the UE should perform blind detection for the DM-RS.

3) Embodiment 2-3: Delivery of Statistical Information and/or Transmission (Tx) Counter about the LBT Operation Using DCI When the BS transmits information related to the transmission (Tx) counter to the UE, the information related to the Tx counter can be transmitted through DCI that is required to transmit PDSCH resource information during transmission of the DL burst. For example, when information such as RMSI is always transmitted within the SMTC window, Tx counter information about the SS/PBCH block can be transmitted through DCI to be used for RMSI. In addition, for the DL burst, in the case of transmitting signaling information about the success or failure of DL burst transmission caused by LBT using the Tx counter, this signaling information can be transmitted through DCI related to the DL burst transmission.

In other words, when different LBT-related parameters are applied to the respective channels, counter information for each channel can be transmitted so that such counter information can be transmitted per channel. Therefore, the UE may define the statistical information and/or the Tx counter about a separate LBT operation for each RNTI, and the BS can transmit the statistical information and/or the Tx counter about the LBT operation for each RNTI.

In addition, the probability of RRM-RS transmission delay (or successful RRM-RS transmission) caused by LBT is quantized and transmitted through DCI. Also, in the case of transmitting the probability of RRM-RS transmission delay (or successful RRM-RS transmission) caused by LBT for the entire cell, a group-common PDCCH for broadcast or multicast can also be used.

Embodiment 3: UE Operation Using Either Transmission (Tx) Counter Information about the LBT Operation or Statistical Information about the LBT Operation As described above, the UE can perform the following operations using either the Tx counter information about the LBT operation or the statistical information about the LBT operation.

1) Embodiment 3-1: Correction of L3 Filtering Value

As described above, the UE may autonomously determine whether RRM-RS transmission caused by LBT is delayed, and may determine whether to perform filtering in the higher layer using the result of determination. However, if it is recognized that the RRM-RS transmission delay is erroneously determined through the Tx counter information, the UE can correct the previously filtered information using the information about the corresponding Tx counter and the information about the magnitude and quality of previously measured signal.

In addition, the UE may report, to the higher layer, a value measured at the time where it is determined whether the Tx counter information is transmitted, so that the higher layer can perform filtering based on the reported information. At this time, if the Tx counter value increases by one or more, the UE may select information that is considered valid from among information about the magnitude and quality of previously measured signals, and may then transmit the selected valid information to the higher layer.

2) Embodiment 3-2: Cell Redirection or Frequency Redirection Based on the Probability of RRM-RS Transmission Delay (or Successful RRM-RS Transmission) Caused by LBT It can be assumed that the probability of RRM-RS transmission delay (or successful RRM-RS transmission) caused by LBT, which is transferred from the BS to the UE, is determined based on traffic load caused by another enterprise network or another RAT existing around the corresponding BS. At this time, even if the quality of a signal that is transferred from the serving BS to the UE is considered good, it may be impossible for the UE to receive a high-quality service (e.g., high data throughput or low latency) from the BS.

In this state, continuous connection between the UE and the serving BS may be considered undesirable in terms of service maintenance. Although the quality of the signal received from the BS is relatively low in level, it may be preferable that the UE be handed over to another cell or another frequency band to receive a desired service.

Therefore, the UE can determine cell redirection or frequency redirection based on the probability of RRM-RS transmission delay caused by LBT for each cell or the probability of RRM-RS transmission delay caused by LBT for each frequency band. In this case, the UE may also directly calculate the probability of RRM-RS transmission delay caused by LBT for each cell or for each frequency band using the Tx counter value.

For example, the UE may determine cell redirection or frequency redirection based on a constant threshold. In addition, if the probability of RRM-RS transmission delay about a specific cell or a specific frequency band is high, the probability of redirecting the specific cell or the specific frequency band can be defined to be high, so that the UE can determine cell redirection or frequency redirection based on the defined probability of redirection. In more detail, the UE may generate random numbers of [0,1], may compare the generated value with the probability of redirection for a specific cell or a specific frequency band, and may determine cell redirection or frequency redirection based on the result of comparison. Meanwhile, as described above, the UE may determine the presence or absence of RRM-RS transmission delay based on the probability of RRM-RS transmission delay, may directly determine cell redirection or frequency redirection based on the result of determination, and may transmit information about the presence or absence of RRM-RS transmission delay to the BS, so that the BS can determine cell redirection or frequency redirection based on the received information. At this time, the probability of RRM-RS transmission delay may refer to RRM-RS transmission information that is transferred from the BS to the UE, or the UE may autonomously determine the presence or absence of RRM-RS transmission delay or the probability of RRM-RS transmission delay.

In addition, the probability of redirecting a specific cell or a specific frequency band based on either the threshold or the probability of RRM-RS transmission delay (or successful RRM-RS transmission) caused by LBT may be configured by the BS. Information about whether the configured probability will actually be used for cell redirection or frequency redirection can be transferred to the UE.

Moreover, in the case where a target cell to be configured or another cell existing in the frequency to be reconfigured (or redirected) transmits statistical information about either the same Tx counter or the same LBT operation, the transmission delay probability of a cell to be redirected or the transmission delay probability of a cell existing in the frequency to be redirected should be less than a predetermined value, so that the UE can determine whether to perform redirection.

3) Embodiment 3-3: Determining Whether Measurement Report for Neighbor Cell has been Transmitted The NR system may measure the magnitude and quality of signals of a neighbor cell. If the measured signal satisfies a specific condition, the NR system may report, to the BS, the magnitude and quality of signals of a serving cell, a neighbor cell, and/or cells of another frequency band through measurement report (MR) information. Then, the BS may instruct the UE to be handed over to a specific target cell based on the received MR information. In this case, the specific condition may indicate that RSRP of the serving cell is measured to be less than a threshold, or may indicate that RSRP of the neighbor cell is higher than RSRP of the serving cell by a threshold.

On the other hand, the BS may select the cell and the frequency band based on the magnitude and quality of signals, so that the BS cannot reflect traffic load received from either another enterprise network or another RAT occupied by a target cell. As a result, although the BS cannot transmit signals to the UE due to channel occupancy of another RAT in the unlicensed band, there occurs the problem in which a link between the BS and the UE is maintained.

In order to address this problem, if the probability of RRM-RS transmission delay caused by LBT of a neighbor cell is higher than a predetermined threshold, or if the RRM-RS transmission delay probability of the serving cell is higher than the RRM-RS transmission delay probability of the neighbor cell, the UE may not report information about the magnitude and quality of signals of the corresponding cell. In this case, the UE may ignore an event such as handover caused by from the magnitude and quality of signals of the corresponding cell. In addition, the probability of RRM-RS transmission delay may be calculated based on either Tx counter information and/or statistical information about the LBT operation, which are received from the BS, or may be calculated by information self-decided by the UE. In this case, a threshold where measurement report (MS) is not performed may be configured by the BS.

In contrast, in order for the BS to control the event such as a handover, if the corresponding event occurs and the magnitude and quality of signals related to the event are reported, the UE may enable information about the RRM-RS transmission delay (or successful RRM-RS transmission) caused by LBT to be included in the measurement report (MS), and may then report the resultant measurement report (MS). The BS may recognize traffic load based on the reported probability of RRM-RS transmission delay caused by LBT, and may determine which cell will be used as a handover cell or a non-handover cell based on the recognized traffic load.

Embodiment 4: UE and/or BS Operations Based on Uplink Listen Before Talk (LBT) Statistics Embodiments 1 to 3 have disclosed the operation for enabling the UE to change the serving cell to another cell when RRM-RS transmission caused by LBT failure is contiguously dropped during RRM (Radio Resource Management) measurement. In more detail, Embodiments 1 to 3 have disclosed the method for enabling the UE to perform RLF (Radio Link Failure) and/or the method for enabling the UE to autonomously perform serving-cell redirection or frequency redirection.

In Embodiments 1 to 3, the UE can move to a new frequency so as to select an appropriate cell to be camped on. If the appropriate cell exists in the same frequency, the serving cell may be changed to another cell. However, the changed serving cell should be a cell in which DL transmission drop caused by channel load does not cause a serious problem. Embodiments 1 to 3 have assumed that transmission (Tx) drop or transmission (Tx) delay caused by channel load are mainly generated by wireless devices (e.g., UE or wireless device of another RAT) located around the BS, and the Tx drop or Tx delay may be differently determined depending on the positions of BSs. In other words, when there arises the transmission problem caused by a wireless device located around the BS in the unlicensed band, the operations for recovering the communication service quality to address the communication service problem are defined in Embodiments 1 to 3.

However, a problem similar to those of Embodiments 1 to 3 may also occur when the UE performs UL transmission. Therefore, there is a need for the UE to perform the operation of recovering the service quality in a similar way to DL transmission. This recovery operation may correspond to RRC (Radio Resource Control) re-establishment caused by RLF (Radio Link Failure).

If the UE desires to acquire the service quality, the UE can search for the appropriate cell in the same frequency. However, if the problem occurs in UL transmission and no problem occurs in the DL channel quality, the UE may attempt to re-access the same cell as the current serving cell existing in the same frequency. Assuming that channel load is not reduced in the vicinity of the UE, although the UE fails to access another cell or succeeds in accessing another cell, the same UL transmission problem may repeatedly occur. Therefore, various methods for addressing the above-mentioned problems will hereinafter be described with reference to Embodiment 4.

Figure 18:
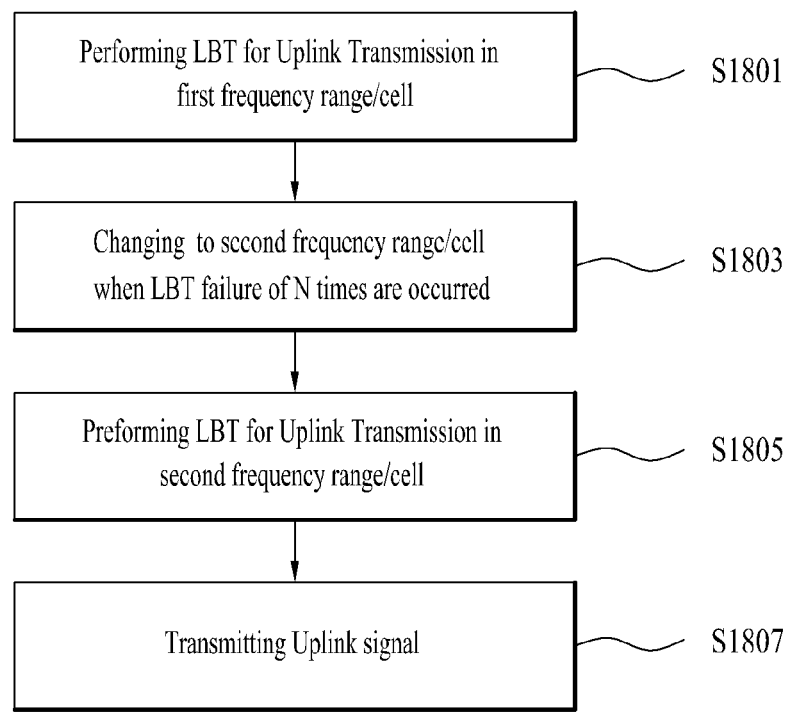
FIG. 18 is a flowchart illustrating operations of a user equipment (UE) according to a fourth embodiment.
Figure 19:
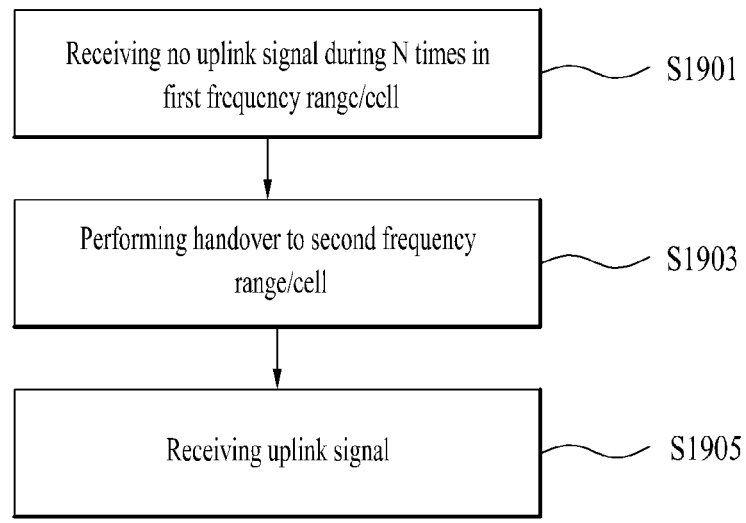
FIG. 19 is a flowchart illustrating operations of a base station (BS) according to a fourth embodiment.
Figure 20:
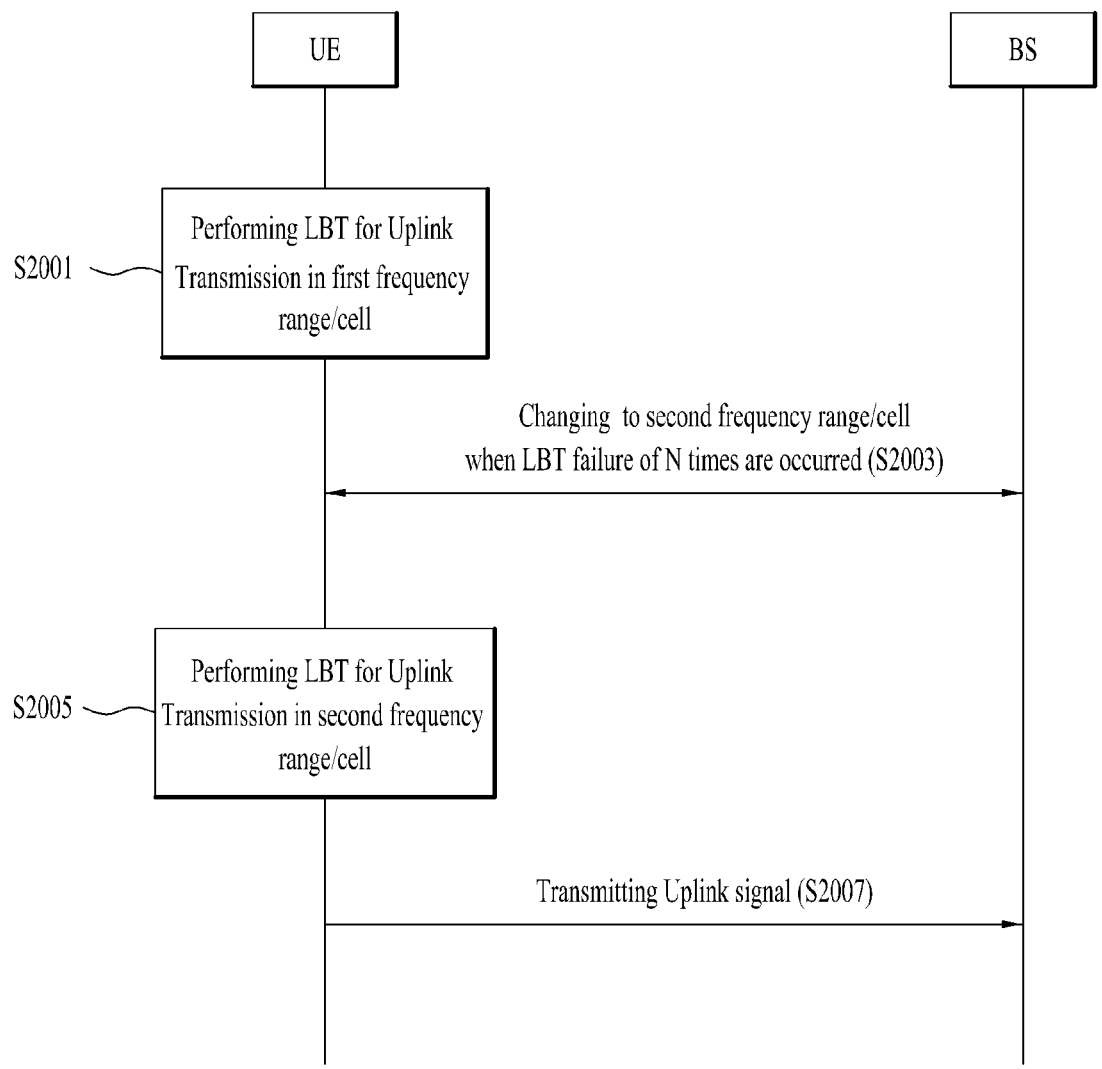
FIG. 20 is a flowchart illustrating operations of a network according to a fourth embodiment.

FIG. 18 is a flowchart illustrating UE operations according to Embodiment 4. FIG. 19 is a flowchart illustrating BS operations according to Embodiment 4. FIG. 20 is a flowchart illustrating network operations according to Embodiment 4.

FIG. 18 is a flowchart illustrating examples of UE operations according to Embodiment 4. Referring to FIG. 18, the UE may perform LBT for UL transmission in the first frequency range and/or the first cell (S1801). If LBT failure occurs N times or more, the UE may be handed over to a second frequency range based on the following embodiments 4-1 to 4-5 or the serving cell of the UE may be changed to the second cell (S1803).

The UE may perform LBT for UL transmission in the second frequency range and/or the second cell (S1805). If the UE succeeds in LBT processing, the UE can transmit UL signals to the BS (S1807). However, if LBT failure has occurred N times or more (S1805), the UE may move to another frequency range according to Embodiments 4-1 to 4-5 or the serving cell of the UE is changed to another cell, so that the UE can repeatedly perform LBT processing in the corresponding frequency range and/or the corresponding cell.

Figure 22:
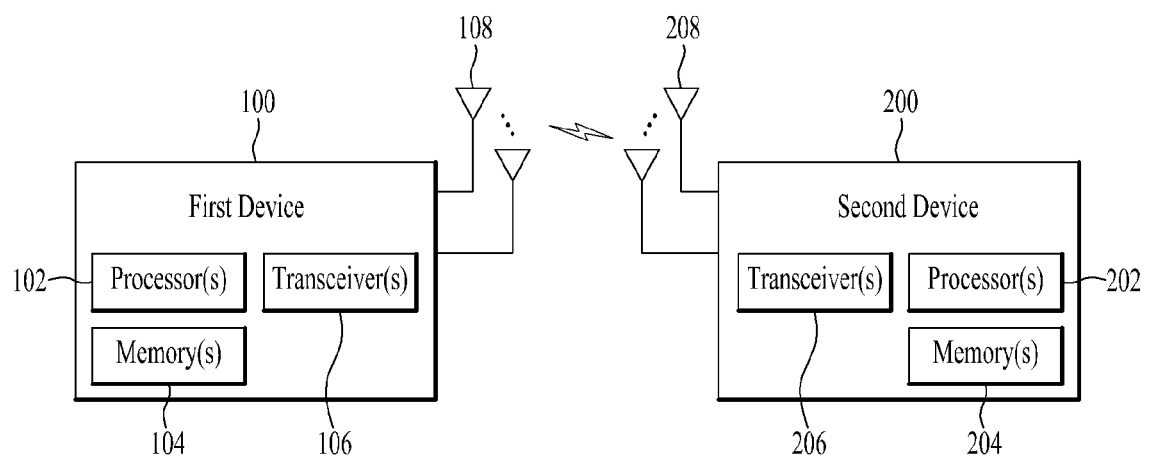
FIGS. 22 to 24 illustrate examples of various wireless devices to which embodiments of the present disclosure are applied.
Figure 23:
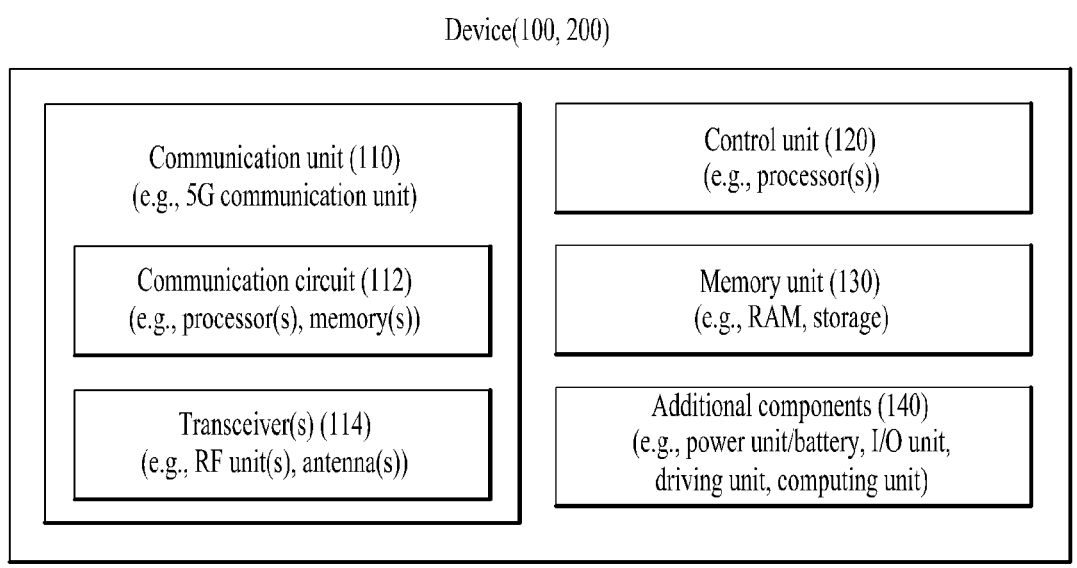
Figure 24:
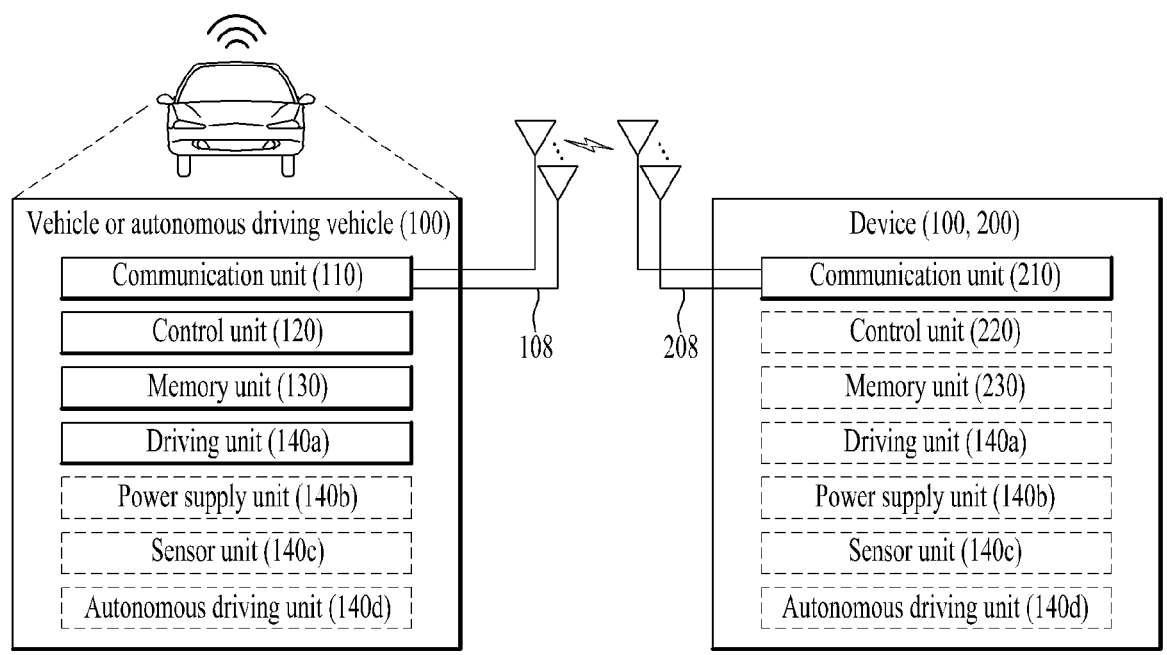

In addition, the UE may be any one of various devices shown in FIGS. 22 to 24. In other words, the UE operation of FIG. 18 may be performed or executed by any one of various devices shown in FIGS. 22 to 24. For example, the UE operation of FIG. 18 may be performed or executed by the first wireless device 100 of FIG. 22 or the wireless devices 100 and 200 of FIG. 23.

FIG. 19 is a flowchart illustrating BS operations according to Embodiment 4. Referring to FIG. 19, if the BS does not receive the UL signal in the first frequency range and/or the first cell N times or more (S1901), the BS may instruct the UE to move from the first frequency range to the second frequency range, may instruct the UE to be handed over from the first cell to the second cell, and may instruct the UE to perform handover (S1903). In this case, the handover method or the BS operation for instructing the UE to perform a handover can be performed according to Embodiments 4-1 to 4-5. Thereafter, the BS can receive the UL signal in the second frequency range and/or the second cell (S1905). If the BS does not receive the UL signal N times or more (S1905), the BS returns to step S1903, so that the BS can again perform handover or can instruct the UE to perform handover.

In addition, the BS may be any one of various devices shown in FIGS. 22 to 24. In other words, the BS operation of FIG. 19 may be performed or executed by any one of various devices shown in FIGS. 22 to 24. For example, the BS operation of FIG. 19 may be performed or executed by a second wireless device 200 of FIG. 22 or wireless devices 100 and 200 of FIG. 23.

FIG. 20 is a flowchart illustrating examples of the network operation according to Embodiment 4. Referring to FIG. 20, the UE may perform LBT processing for UL transmission in the first frequency range and/or the first cell (S2001). If LBT failure has occurred N times or more, the UE may move to the second frequency range or may change the serving cell to the second cell according to Embodiments 4-1 to 4-5 (S2003).

The UE may perform LBT for UL transmission in the second frequency range and/or the second cell (S2005). If the UE succeeds in LBT processing, the UE can transmit UL signals to the BS (S2007). However, if LBT failure has occurred N times or more (S2005), the UE may move to another frequency range according to Embodiments 4-1 to 4-5 or the serving cell of the UE is changed to another cell, so that the UE can repeatedly perform LBT processing in the corresponding frequency range and/or the corresponding cell.

(1) Embodiment 4-1

If LBT failure related to UL transmission occurs N times or more or occurs a predetermined number of times or more, the UE may release RRC (Radio Resource Control) connection to the serving cell, and may move from a current frequency band to the other frequency band, so that the UE can search for a cell suitable for RRC connection in the other frequency band.

For example, when UL transmission problems occurs by channel load generated from other wireless devices existing in the vicinity of the UE as described above, the UE can report the UL transmission problems to the higher layer. At this time, if the higher layer determines that a current radio link problem has occurred by LBPT failure, the UE may release RRC connection to the current serving cell, may move to another frequency band, may search for a cell suitable for RRC connection, and may attempt to access the suitable cell.

(2) Embodiment 4-2

If LBT failure related to UL transmission occurs N times or more or occurs a predetermined number of times or more on average, and if the UE measures channel load of the currently used frequency for a predetermined time and if the measured channel load is equal to or less than a predetermined value, the UE may release RRC connection to the serving cell, may move from a current frequency band to the other frequency band, and may search for a cell appropriate for RRC connection.

For example, when UL transmission problems occurs by channel load generated from other wireless devices existing in the vicinity of the UE as described above, the UE can report the UL transmission problems to the higher layer. At this time, if the higher layer determines that a current radio link problem has occurred by LBT failure, the higher layer may instruct a lower layer to measure channel load for a predetermined time. Also, the lower layer may measure channel load for a predetermined time, and may again report the measurement channel load to the higher layer. In this case, as soon as channel load is equal to or less than a predetermined time, the lower layer may immediately report the lowered channel load to the higher layer. After lapse of the predetermined time, an average value of channel load measured for the predetermined time, a specific time where channel load is lowered, or a report time of the lowered channel load can be reported.

If the channel load value included in report information transmitted to the higher layer is reduced to at least a predefined value or a threshold value decided by the BS, the UE can continuously maintain RRC connection to the serving cell. However, if the channel load value included in report information transmitted to the higher layer is higher than the predefined value or the threshold value decided by the BS, the UE can release RRC connection to the serving cell, can move to the other frequency band, and can search for a cell appropriate for RRC connection.

(3) Embodiment 4-3

If LBT failure related to UL transmission occurs N times or more or occurs a predetermined number of times or higher on average, the UE may release RRC connection to the serving cell, may measure channel load of the currently used frequency for a predetermined time, and may decide whether to handover to another frequency band based on the measurement result.

For example, when UL transmission problems occurs by channel load generated from other wireless devices existing in the vicinity of the UE as described above, the UE can report the UL transmission problems to the higher layer. At this time, if the higher layer determines that a current radio link problem has occurred by LBT failure, the higher layer can release RRC connection to the serving cell. Thereafter, in order to search for a cell to be used for a new RRC connection, the higher layer may instruct the lower layer to measure channel load for a predetermined time. At this time, if the channel load reported by the higher layer is equal to or less than a predefined value or a threshold value decided by the BS, the UE can search for a cell appropriate for RRC connection at a current frequency connected to the UE. However, if the channel load reported by the lower layer is equal to or higher than a predefined value or a threshold value decided by the BS, the UE may move from a current frequency band to the other frequency band, and may search for a cell appropriate for RRC connection in the other frequency band.

(4) Embodiment 4-4

The BS may instruct the UE to transmit UL channels such as PUSCH, PUCCH, SRS, etc. through either dynamic transmission based on dynamic scheduling and/or semi-static resource configuration. However, if the UE continuously detects information indicating non-transmission of a channel instructed by the BS at least N times, or if the UE detects the fact that the probability of non-transmission of a channel indicating that non-transmission of the BS-instructed channel is equal to or higher than a specific value on average, the BS may determine occurrence of the UE uplink transmission problem, so that the BS may instruct the UE to release call connection and then move to another frequency band, and may instruct the UE to perform handover to a cell existing in another frequency band. If the BS instructs the UE to move to another frequency band, the UE may switch to the idle mode, may search for a cell appropriate for RRC connection at the instructed frequency band, and may perform call connection at the instructed frequency band.

On the other hand, assuming that the DL channel state is not good, if the BS continuously detects non-detection of the DL channel at least N times, and if the BS detects that the probability of non-transmission of the DL channel is equal to or higher than a specific value on average, the UE may autonomously determine RLF (Radio Link Failure), and may search for a new cell to be used for call connection.

(5) Embodiment 4-5

If LBT failure related to UL transmission occurs N times or more or occurs a predetermined number of times or higher on average, and if a channel such as PUSCH is scheduled for a predetermined time period in which the BS primarily occupies a channel and shares the channel occupied for uplink within a specific time (i.e., a time section in which the rule for LBT is not strict) in the same manner as COT (channel occupancy time) sharing, the UE may report information indicating that channel load is significantly large, to the BS through an uplink (UL) channel such as PUSCH. In addition, the UE can wait for receiving the BS instruction related to the corresponding report for a predetermined time. However, if the BS does not perform any instruction for the predetermined time, the UE may release RRC connection to the serving cell, may move to the other frequency band, and may search for a cell appropriate for RRC connection at the other frequency band. In this case, the BS may instruct the UE to perform handover to another cell existing in another frequency band upon receiving the channel load report from the UE, so that the UE can move to a specific frequency band while releasing call connection.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 21:
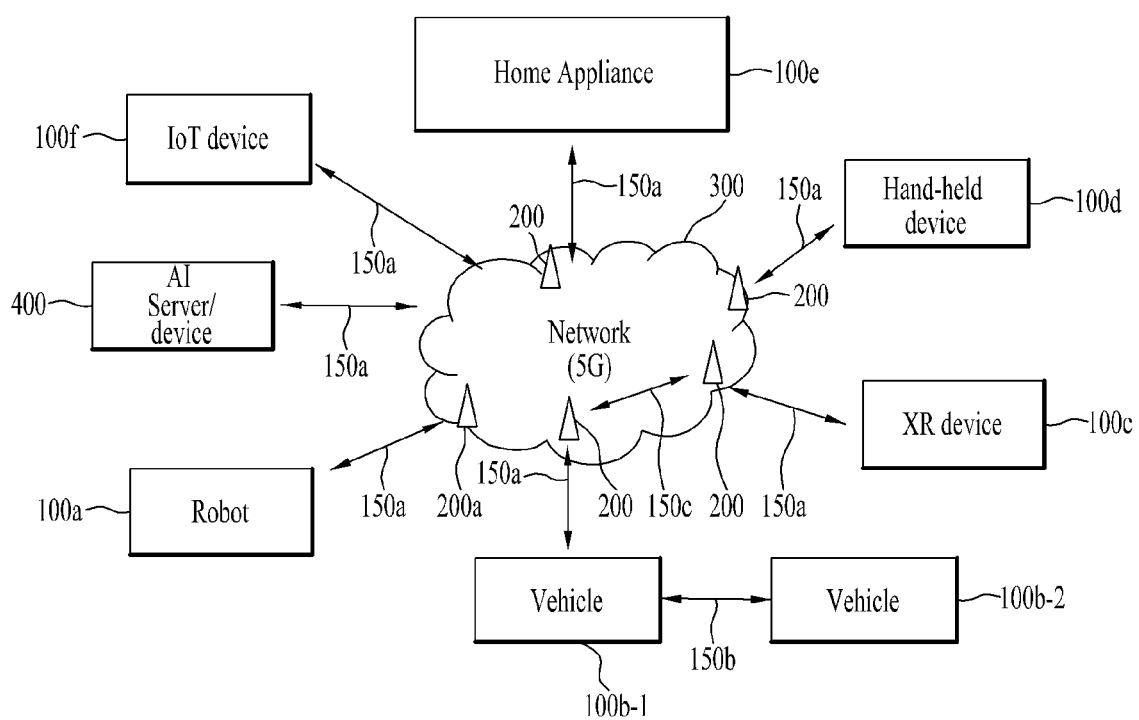
FIG. 21 illustrates an example of a communication system to which embodiments of the present disclosure are applied.

FIG. 21 illustrates a communication system 1 applied to the present disclosure.

Referring to FIG. 21, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., SL communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, SL communication 150b (or, D2D communication), or inter-B S communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

FIG. 22 illustrates wireless devices applicable to the present disclosure.

Referring to FIG. 22, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

In more detail, a method for controlling instructions and/or operations by the processor 102 of the first wireless device 100, and the instructions and/or operations stored in the memory 104 will hereinafter be described with reference to the attached drawings.

Although the following operations will be disclosed based on the control operation of the processor 102 when viewed from the processor 102, it should be noted that software code, etc. required to perform such operation can be stored in the memory 104.

The processor 102 may perform the LBT procedure for UL transmission in the first frequency range and/or the first cell. If LBT failure has occurred N times or more, the processor 102 may move to the second frequency range according to Embodiments 4-1 to 4-5, or the serving cell may switch to the second cell.

The processor 102 may perform the LBT procedure for UL transmission in the second frequency range and/or the second cell. If the LBT procedure is successful, the processor 102 may control the transceiver 106 to transmit UL signals. However, if LBT failure also occurs in the second frequency range and/or the second cell at least N times, the processor 102 may move to another frequency range according to Embodiments 4-1 to 4-5, may change the serving cell to another cell, and may again perform the LBT procedure in the corresponding frequency range and/or the corresponding cell, so that the processor 102 can repeatedly perform the above operations as described above.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

In more detail, a method for controlling instructions and/or operations by the processor 202 of the second wireless device 200, and the instructions and/or operations stored in the memory 204 will hereinafter be described with reference to the attached drawings.

Although the following operations will be disclosed based on the control operation of the processor 202 when viewed from the processor 202, it should be noted that software code, etc. required to perform such operation can be stored in the memory 204.

If the processor 202 does not receive UL signals in the frequency range and/or the first cell from the transceiver 206 at least N times, the processor 202 may instruct the transceiver 206 to move from the first frequency range to the second frequency range, may instruct the transceiver 206 to perform handover from the first cell to the second cell, or may enable the first wireless device 100 to perform handover using the transceiver 206. In this case, a detailed method for instructing the first wireless device 100 to perform such handover can be performed according to Embodiments 4-1 to 405. Thereafter, the processor 202 may control the transceiver 206 to receive UL signals in the second frequency range and/or the second cell. If the processor 202 does not receive UL signals in the second frequency range and/or the second cell at least N times, the processor 202 may instruct the transceiver 206 to perform handover or may enable the first wireless device 100 to perform handover using the transceiver 206.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals.

To this end, the one or more transceivers 106 and 206 may include (analog) oscillators and/or filters.

FIG. 23 illustrates another example of a wireless device applied to the present disclosure. The wireless device may be implemented in various forms according to a use case/service (refer to FIG. 21).

Referring to FIG. 23, wireless devices 100 and 200 may correspond to the wireless devices 100 and 200 of FIG. 22 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcasting terminal, a hologram device, a public safety device, an MTC device, a medical device, a FinTech device (or a finance device), a security device, a climate/environment device, the AI server/device (400 of FIG. 21), the BSs (200 of FIG. 21), a network node, or the like. The wireless device may be mobile or fixed according to a use case/service.

In FIG. 23, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 23 will hereinafter be described with reference to the attached drawings.

FIG. 24 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 25:
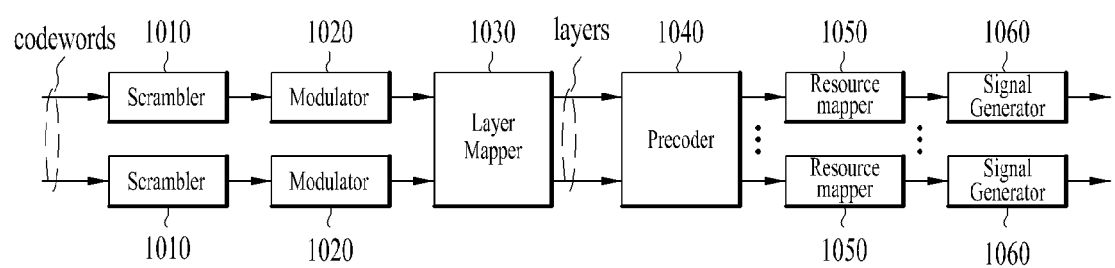
FIG. 25 illustrates an exemplary signal processing circuit to which embodiments of the present disclosure are applied.

FIG. 25 illustrates a signal processing circuit for Tx signals.

Referring to FIG. 25, a signal processing circuit 1000 may include a scrambler 1010, a modulator 1020, a layer mapper 1030, a precoder 1040, a resource mapper 1050, and a signal generator 1060. The operations/functions shown in FIG. 25 may be performed by the processors 102 and 202 and/or the transceivers 106 and 206 shown in FIG. 25, without being limited thereto. Hardware elements shown in FIG. 23 may be implemented by the processors 102 and 202 and/or the transceivers 106 and 206 shown in FIG. 25. For example, the blocks 1010 to 1060 may be implemented by the processors 102 and 202. In addition, the blocks 1010 to 1050 may be implemented by the processors 102 and 202 shown in FIG. 25, and the block 1060 may be implemented by the transceivers 106 and 206 shown in FIG. 25.

The codeword may be converted into a radio signal (or a radio frequency (RF) signal) through the signal processing circuit 1000 shown in FIG. 28. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK (pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 28. For example, the wireless devices 100 and 200 (shown in FIG. 26) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

The examples of the present disclosure may be implemented through various means. For example, the examples may be implemented by hardware, firmware, software, or a combination thereof. When implemented by hardware, an example of the present disclosure may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessor, or the like.

When implemented by firmware or software, an example of the present disclosure may be implemented in the form of a module, a procedure, or a function that performs the functions or operations described above. Software code may be stored in a memory unit and executed by a processor. The memory unit may be located inside or outside the processor, and may exchange data with the processor by various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method and device for transmitting and receiving UL signals in the unlicensed band according to the present disclosure have been disclosed centering upon examples applied to 5$^{th}$ generation NewRAT systems, the above-mentioned embodiments of the present disclosure can also be applied to various wireless communication systems as well as the NewRAT systems.

What is claimed is:

1. A method of transmitting a signal by a user equipment (UE) in an unlicensed band, the method comprising:
   performing a listen before talk (LBT) operation in a first frequency range;
   releasing a first radio resource control (RRC) connection to a serving cell related to the first frequency range, based on the LBT operation having failed a predetermined number of times or more;
   transmitting, to a base station (BS), a report about the LBT operation having failed the predetermined number of times or more;
   establishing a second RRC connection to a cell related to a second frequency range different from the first frequency range, based on that a response to the report has not been received from the BS within a first time duration; and
   transmitting an uplink (UL) signal in the second frequency range.

2. The method according to claim 1, wherein the releasing the first RRC connection to the serving cell includes:
   measuring channel load of the first frequency range based on the LBT operation having failed the predetermined number of times or more; and
   releasing the first RRC connection to the serving cell based on the channel load being higher than a threshold.

3. The method according to claim 1, wherein the establishing the second RRC connection to the cell related to the second frequency range includes:
   measuring channel load of the first frequency range; and
   establishing the second RRC connection to the cell related to the second frequency range based on the channel load being higher than a threshold.

4. The method according to claim 1, wherein
   the UE is configured to communicate with at least one of another UE, a network, or an autonomous vehicle.

5. A user equipment (UE) configured to transmit a signal in an unlicensed band, the UE comprising:
   at least one transceiver;
   at least one processor; and
   at least one computer memory operably connectable to the at least one processor and storing instructions that, when executed by the at least one processor, perform operations comprising:
   performing a listen before talk (LBT) operation in a first frequency range;
   releasing a first radio resource control (RRC) connection to a serving cell related to the first frequency range, based on the LBT operation having failed a predetermined number of times or more;
   transmitting, to a base station (BS), a report about the LBT operation having failed the predetermined number of times or more;
   establishing a second RRC connection to a cell related to a second frequency range different from the first frequency range, based on that a response to the report has not been received from the BS within a first time duration; and
   transmitting an uplink (UL) signal in the second frequency range.

6. The UE according to claim 5, wherein the releasing the first RRC connection to the serving cell includes:
   measuring channel load of the first frequency range based on the LBT operation having failed the predetermined number of times or more; and
   releasing the first RRC connection to the serving cell based on the channel load being higher than a threshold.

7. The UE according to claim 5, wherein the establishing the second RRC connection to the cell related to the second frequency range includes:
   measuring channel load of the first frequency range; and
   establishing the second RRC connection to the cell related to the second frequency range based on the channel load being higher than a threshold.

8. The UE according to claim 5, wherein
   the UE is configured to communicate with at least one of another UE, a network, or an autonomous vehicle.

9. A device configured to transmit a signal in an unlicensed band, the device comprising:
   at least one processor; and
   at least one computer memory operably connectable to the at least one processor and storing instructions that, when executed by the at least one processor, perform operations comprising:
   performing a listen before talk (LBT) operation in a first frequency range;
   releasing a first radio resource control (RRC) connection to a serving cell related to the first frequency range, based on the LBT operation having failed a predetermined number of times or more;
   transmitting, to a base station (BS), a report about the LBT operation having failed the predetermined number of times or more;
   establishing a second RRC connection to a cell related to a second frequency range different from the first frequency range, based on that a response to the report has not been received from the BS within a first time duration; and
   transmitting an uplink (UL) signal in the second frequency range.

* * * * *